United States Patent
Tomonaga et al.

(10) Patent No.: US 8,274,627 B2
(45) Date of Patent: Sep. 25, 2012

(54) LIQUID CRYSTAL PANEL AND LIQUID CRYSTAL DISPLAY

(75) Inventors: Masatoshi Tomonaga, Ibaraki (JP); Hiroyuki Takemoto, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 347 days.

(21) Appl. No.: 12/745,609

(22) PCT Filed: Nov. 18, 2008

(86) PCT No.: PCT/JP2008/070952
§ 371 (c)(1),
(2), (4) Date: Jun. 1, 2010

(87) PCT Pub. No.: WO2009/072391
PCT Pub. Date: Jun. 11, 2009

(65) Prior Publication Data
US 2010/0309414 A1    Dec. 9, 2010

(30) Foreign Application Priority Data

Dec. 7, 2007 (JP) .................................. 2007-317442

(51) Int. Cl.
*G02F 1/1335* (2006.01)
(52) U.S. Cl. ........................................ 349/118; 349/96
(58) Field of Classification Search .................. 349/117, 349/118, 119, 96, 132, 121, 141
See application file for complete search history.

(56) References Cited

U.S. PATENT DOCUMENTS

| | | |
|---|---|---|
| 6,115,095 A | 9/2000 | Suzuki et al. |
| 2005/0200792 A1 | 9/2005 | Jeon et al. |
| 2005/0206817 A1 | 9/2005 | Kajita et al. |
| 2006/0062934 A1* | 3/2006 | Hayashi et al. ............. 428/1.31 |
| 2006/0114383 A1 | 6/2006 | Kobayashi et al. |
| 2009/0231520 A1 | 9/2009 | Uchiyama et al. |

(Continued)

FOREIGN PATENT DOCUMENTS

JP    11-133408 A    5/1999

(Continued)

OTHER PUBLICATIONS

Japanese Office Action dated Aug. 2, 2011, issued in corresponding Japanese Patent Application No. 2007-317442.

(Continued)

*Primary Examiner* — Thoi Duong
(74) *Attorney, Agent, or Firm* — Westerman, Hattori, Daniels & Adrian, LLP

(57) ABSTRACT

The invention provides a liquid crystal panel and a liquid crystal display device, which has suppressed light leakage at an angle of 45 degrees to an absorption axis of a polarizing plate, a low black-state brightness in an oblique direction and an improved contrast. The liquid crystal panel comprises a liquid crystal cell including a liquid crystal layer containing liquid crystal molecules that is oriented in homogeneous alignment when no electric field is applied thereto, a first polarizer placed on one side of the liquid crystal cell, a second polarizer placed on another side of the liquid crystal cell, a first anisotropic optical element placed between the liquid crystal cell and the first polarizer and satisfying $nx_1 > ny_1 > nz_1$, and a second anisotropic optical element placed between the first anisotropic optical element and the liquid crystal cell and satisfying $nz_2 > nx_2 > ny_2$, wherein the slow axis of the first anisotropic optical element is parallel to the slow axis of the second anisotropic optical element.

13 Claims, 3 Drawing Sheets

U.S. PATENT DOCUMENTS

2011/0116023 A1  5/2011  Kajita et al.

FOREIGN PATENT DOCUMENTS

| | | |
|---|---|---|
| JP | 2005-189632 A | 7/2005 |
| JP | 2005-208356 A | 8/2005 |
| JP | 2006-084700 A | 3/2006 |
| JP | 2006-178401 A | 7/2006 |
| JP | 2006-520008 A | 8/2006 |
| JP | 2007-148099 A | 6/2007 |
| JP | 2007-232873 A | 9/2007 |
| JP | 2007-232874 A | 9/2007 |

OTHER PUBLICATIONS

Korean Office Action dated Jul. 28, 2011, issued in corresponding Korean Patent Application No. 2010-7011621.

International Search Report of PCT/JP2008/070952, Mailing Date of Dec. 16, 2008.

Notification of Transmittal of Copies Translation of the International Preliminary Report on Patentability (Form PCT/IB/338) of International Application No. PCT/JP2008/069646 mailed Jun. 10, 2010 with Forms PCT/IB/373 and PCT/ISA/237.

Korean Office Action dated Mar. 29, 2012, issued in corresponding Korean Patent Application No. 2010-7011621.

Notification of Transmittal of Copies Translation of the International Preliminary Report on Patentability (Form PCT/IB/338) of International Application No. PCT/JP2008/070952 mailed Aug. 19, 2010 with Forms PCT/IB/373 and PCT/ISA/237.

Submission of Information dated Oct. 21, 2011, issued in corresponding Japanese Patent Application No. 2007-317442.

Japanese Office Action dated Nov. 29, 2011, issued in coreesponding Japanese Patent Application No. 2007-317442.

\* cited by examiner

LIQUID CRYSTAL PANEL AND LIQUID CRYSTAL DISPLAY

TECHNICAL FIELD

The invention relates to a liquid crystal panel including a liquid crystal cell, polarizers and anisotropic optical elements. The invention also relates to a liquid crystal display produced with the liquid crystal panel.

BACKGROUND ART

In a liquid crystal display having an in-plane switching (IPS) mode liquid crystal cell, the liquid crystal molecules are aligned in a substantially horizontal direction when no electric field is applied, and turned by about 45 degrees when an electric field is applied in a lateral direction, so that transmission of light (white image) and shutting out of light (black image) are controlled. A liquid crystal display having a conventional IPS mode liquid crystal cell has a problem in which the contrast is relatively low when the screen is viewed at an oblique angle of 45° to the absorption axis of the polarizing plate (azimuth angle of 45°, 135°, 225°, or 315°), and a phenomenon in which displayed colors vary with viewing angle (also called color shift) is significant. Therefore, a method for reducing the color shift is disclosed in which two or more retardation films are placed on one side of the liquid crystal cell (see for example Patent Literature 1). A method for improving the contrast as well as reducing the color shift is also proposed in which a negative biaxial retardation film and a positive C-plate are used to improve the contrast in oblique directions (see for example Patent Literature 2).

On the other hand, large-screen liquid crystal displays for use in LCD televisions or the like tend to be increased in light-source brightness and therefore need to have a higher contrast liquid crystal panel. However, liquid crystal panels according to conventional techniques still have light leakage at an angle of 45° to the absorption axis of the polarizing plate and therefore are not considered to have sufficient contrast.

Patent Literature 1: Japanese Patent Application Laid-Open (JP-A) No. 11-133408
Patent Literature 2: JP-A No. 2006-178401

DISCLOSURE OF INVENTION

Object to be Achieved by the Invention

The invention has been made to solve the problem described above. An object of the invention is to provide a liquid crystal panel and a liquid crystal display with low black-state brightness in oblique directions and improved contrast.

Means for Solving the Problem

As a result of investigations to solve the above problem, the inventors have made the invention based on the finding that the object above can be achieved by the liquid crystal panel and liquid crystal display described below.

Specifically, the invention relates to a liquid crystal panel including a liquid crystal cell including a liquid crystal layer containing a liquid crystal molecule that is oriented in homogeneous alignment when no electric field is applied thereto, a first polarizer placed on one side of the liquid crystal cell, a second polarizer placed on another side of the liquid crystal cell, a first anisotropic optical element placed between the liquid crystal cell and the first polarizer, and a second anisotropic optical element placed between the first anisotropic optical element and the liquid crystal cell. The first anisotropic optical element satisfies the relation $nx_1 > ny_1 > nz_1$, the second anisotropic optical element satisfies the relation $nz_2 > nx_2 > ny_2$, and the slow axis of the first anisotropic optical element is parallel to the slow axis of the second anisotropic optical element. $nx_1$ and $nx_2$ represent the refractive indices of the first and second anisotropic optical elements in in-plane slow axis directions thereof, respectively, $ny_1$ and $ny_2$ represent the refractive indices of the first and second anisotropic optical elements in in-plane fast axis directions thereof, respectively, and $nz_1$ and $nz_2$ represent the refractive indices of the first and second anisotropic optical elements in thickness directions thereof, respectively.

In the liquid crystal panel of the invention, the liquid crystal cell is preferably any one of IPS mode, FFS mode or FLC mode.

The liquid crystal panel of the invention preferably includes an optically isotropic medium between the liquid crystal cell and the second polarizer. Such an optically isotropic medium refers to a medium that does not substantially change the polarization of light passing through in any of the normal direction of the liquid crystal panel and oblique directions. In such an embodiment, the second polarizer 20' and the liquid crystal cell 10 may be laminated with a pressure-sensitive adhesive layer, an adhesive layer or the like without any optical element such as any another film interposed therebetween, or an isotropic optical element 50 may be placed between the liquid crystal cell 10 and the second polarizer 20'.

In a preferred embodiment, an isotropic optical element may also be provided as the optically isotropic medium between the liquid crystal cell 10 and the second polarizer 20'. Such an isotropic optical element refers to an element that does not substantially change the polarization of light passing through in any of the normal direction of the liquid crystal panel and oblique directions, and is intended to include an element having an in-plane retardation $Re_3$ of 10 nm or less and a thickness direction retardation $Rth_3$ of 10 nm or less, wherein the thickness direction retardation $Rth_3$ is defined as $(nx_3 - nz_3)d_3$.

In the liquid crystal panel of the invention, the slow axis of the first anisotropic optical element is preferably perpendicular to the absorption axis of the first polarizer in order to reduce black-state brightness in oblique directions.

One mode of the liquid crystal panel of the invention preferably has such a configuration that the initial alignment direction of the liquid crystal cell is parallel to the direction of the absorption axis of the second polarizer.

In the liquid crystal panel of the invention, it is preferred that the first anisotropic optical element satisfies formulae 1 and 2 below, and that the second anisotropic optical element satisfies formulae 3 and 4 below.

$$90 \text{ nm} < Re_1 < 140 \text{ nm} \quad \text{(formula 1)}$$

$$1.1 < NZ_1 < 1.7 \quad \text{(formula 2)}$$

$$10 \text{ nm} < Re_2 < 70 \text{ nm} \quad \text{(formula 3)}$$

$$80 \text{ nm} < (nz_2 - ny_2)d_2 < 120 \text{ nm} \quad \text{(formula 4)}$$

(wherein, $Re_1 = (nx_1 - ny_1)d_1$, $Re_2 = (nx_2 - ny_2)d_2$, $NZ_1 = (nx_1 - nz_1)/(nx_1 - ny_1)$, and $d_1$ and $d_2$ represent the thickness of the first anisotropic optical element and the thickness of the second anisotropic optical element, respectively.)

Further, in the liquid crystal panel of the invention, it is preferred that the first and second anisotropic optical elements satisfy formula 5 below.

$$120 \text{ nm} < Re_1 + Re_2 < 160 \text{ nm} \quad \text{(formula 5)}$$

Furthermore, in the liquid crystal panel of the invention, it is preferred that the first anisotropic optical element satisfies formula 6 below.

$$120 \text{ nm} < (nx_1 - nz_1)d_1 < 170 \text{ nm} \quad \text{(formula 6)}$$

In the liquid crystal panel of the invention, the second anisotropic optical element preferably includes a stretched film having a polymer with negative birefringence as a main component.

The liquid crystal panel of the invention may employ any of the so-called "O-mode" and "E-mode," wherein the initial alignment direction of the liquid crystal cell and the direction of the absorption axis of the polarizer placed on the light source side of the liquid crystal cell is parallel to each other in the O-mode, while they are perpendicular to each other in the E-mode.

Furthermore, the invention relates to a liquid crystal display with above-mentioned liquid crystal panel.

In addition, the invention provides a continuous-sheet laminated polarizing plate for use in production of above-mentioned liquid crystal panel. The polarizing plate preferably includes a polarizer, a first anisotropic optical element satisfying $nx_1 > ny_1 > nz_1$, and a second anisotropic optical element satisfying $nz_2 > nx_2 > ny_2$, which are laminated in this order.

Effect of the Invention

In the liquid crystal panel of the invention, the first and second anisotropic optical elements are placed between the liquid crystal cell and the first polarizer placed on one side of the liquid crystal cell, and the first anisotropic optical element is placed between the first polarizer and the second anisotropic optical element. Therefore, the liquid crystal panel of the invention can form a liquid crystal display with reduced light leakage in dark state at oblique angles and high contrast.

Figure 1:
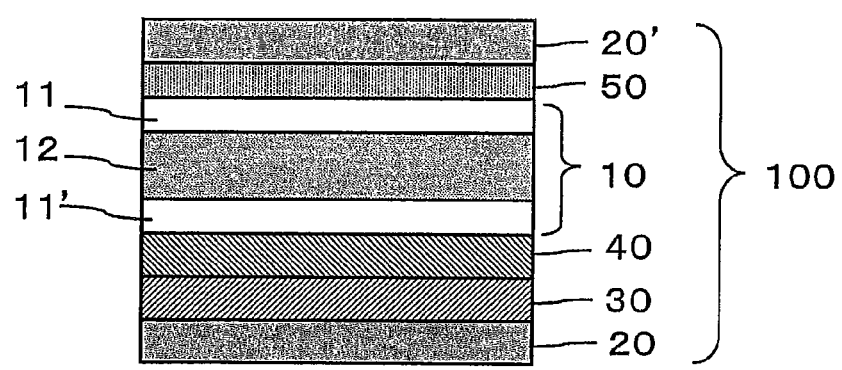
FIG. 1 is a schematic cross-sectional view of a liquid crystal panel according to a preferred embodiment of the invention.

DESCRIPTION OF REFERENCE CHARACTERS 100 liquid crystal panel
10 liquid crystal cell
11, 11 substrate
12 liquid crystal layer
20 first polarizer
20' second polarizer
30 first anisotropic optical element
40 second anisotropic optical element
50 isotropic optical element
60, 60' protective layer
70, 70' surface treatment layer
80 brightness enhancement film
10n initial alignment direction
20a, 20' a absorption axis direction
30e, 40e slow axis direction
110 prism sheet
120 light guide plate
130 light source

BEST MODE FOR CARRYING OUT THE INVENTION

Outline of the Whole of Liquid Crystal Panel

FIG. 1 is a schematic cross-sectional view showing a liquid crystal panel according to a preferred embodiment of the invention. The liquid crystal panel of the invention may employ so-called "O-mode" or so-called "E-mode". The term "O-mode liquid crystal panel" refers to a liquid crystal panel in which the direction of the absorption axis of a polarizer placed on the light source-side of a liquid crystal cell is parallel to the initial alignment direction of the liquid crystal cell. The term "E-mode liquid crystal panel" refers to a liquid crystal panel in which the direction of the absorption axis of a polarizer placed on the light source-side of a liquid crystal cell is perpendicular to the initial alignment direction of the liquid crystal cell. As used herein, the term "parallel" is intended to include not only being completely parallel but also being substantially parallel, and therefore, the parallel angle is generally within ±2°, preferably within ±1°, more preferably within ±0.5°. The term "perpendicular" is intended to include not only being completely perpendicular but also being substantially perpendicular, and therefore, the perpendicular angle is generally in the range of 90°±2°, preferably in the range of 90°±1°, more preferably in the range of 90°±0.5°.

FIG. 2(a) is a schematic perspective view showing a case where the liquid crystal panel employs O-mode, and FIG. 2(b) is a schematic perspective view showing a case where the liquid crystal panel employs E-mode. In FIG. 1 and FIGS. 2(a) and 2(b), the upper and lower sides correspond to the viewer side and the light source side, respectively. It should be noted that the aspect and thickness ratios of each component in these drawings are not shown in true ratios for convenience of easy reference.

A liquid crystal panel 100 includes a liquid crystal cell 10, a first polarizer 20 placed on one side of the liquid crystal cell 10, a second polarizer 20' placed on the other side of the liquid crystal cell 10, a first anisotropic optical element 30 placed between the liquid crystal cell 10 and the first polarizer 20, and a second anisotropic optical element 40 placed between the first anisotropic optical element 30 and the liquid crystal cell 10. As shown in FIG. 2(a) or 2(b), the liquid crystal panel may include an isotropic optical element 50 between the liquid crystal cell 10 and the second polarizer 20'.

The first anisotropic optical element 30 satisfies the relation $nx_1 > ny_1 > nz_1$, wherein $nx_1$ represents its refractive index in the in-plane slow axis direction, $ny_1$ represents its refractive index in the in-plane fast axis direction, and $nz_1$ represents its refractive index in the thickness direction. The second anisotropic optical element 40 also satisfies the relation $nz_2 > nx_2 > ny_2$, wherein $d_2$ represents the thickness of its film, $nx_2$ represents its refractive index in the in-plane slow axis direction, $ny_2$ represents its refractive index in the in-plane fast axis direction, and $nz_2$ represents its refractive index in the direction of its thickness ($d_2$).

For practical purposes, any appropriate protective layer is preferably placed on the outside of the polarizer 20 or 20'. In another embodiment, any other component may be placed between the respective components shown in FIG. 1.

The second polarizer 20' is preferably placed so that its absorption axis is parallel to the initial alignment direction of the liquid crystal cell 10. In this case, the first polarizer 20 is placed so that its absorption axis is perpendicular to the initial alignment direction of the liquid crystal cell 10.

Specifically, when the liquid crystal panel employs O-mode, it is preferred that, as shown in FIG. 2(a), the first polarizer 20, the first anisotropic optical element 30 and the second anisotropic optical element 40 be placed on the viewer side of the liquid crystal cell 10 and that the second polarizer 20' be placed on the light source side of the liquid crystal cell 10. When the liquid crystal panel employs E-mode, it is preferred that, as shown in FIG. 2(b), the first polarizer 20, the first anisotropic optical element 30 and the second anisotropic optical element 40 be placed on the light source side of the liquid crystal cell 10 and that the second polarizer 20' be placed on the viewer side of the liquid crystal cell 10.

A description is given below of the liquid crystal cell, the first and second anisotropic optical elements, and the polarizer as components of the liquid crystal panel of the invention.

[Liquid Crystal Cell]

Referring to FIG. 1, the liquid crystal cell 10 used to form the liquid crystal panel of the invention may include a pair of substrates 11 and 11' and a liquid crystal layer 12 as a display medium held between the substrates 11 and 11'. According to a general structure, one of the substrates (11) is provided with a color filter and a black matrix, while the other of the substrates (11') is provided with a switching element for controlling the electro-optical properties of the liquid crystal, scanning and signal lines for applying gate and source signals to the switching element, respectively, and pixel and counter electrodes. The space between the substrates 11 and 11' (cell gap) may be controlled using spacers or the like. For example, an alignment film comprising polyimide or the like may be provided on the liquid crystal layer 12-contact side of the substrate 11 or 11'.

The liquid crystal layer 12 contains a liquid crystal molecule that is oriented in homogeneous alignment when no electric field is applied thereto. Such a liquid crystal layer (consequently the liquid crystal cell) typically exhibits a refractive index distribution according to nx>ny=nz, wherein nx is the refractive index of the liquid crystal layer in the slow axis direction, ny represents the refractive index of the liquid crystal layer in the fast axis direction, and nz represents the refractive index of the liquid crystal layer in the thickness direction. In the description, ny=nz is intended to include not only cases where ny is completely equal to nz but also cases where ny is substantially equal to nz. The term "the initial alignment direction of the liquid crystal cell" refers to a direction in which the in-plane refractive index of the liquid crystal layer is maximum, as a result of orientation of the liquid crystal molecule in the liquid crystal layer when no electric field is applied thereto.

Typical examples of the drive mode in which the liquid crystal layer exhibiting such a refractive index distribution is used include in-plane switching (IPS) mode, fringe field switching (FFS) mode and ferroelectric liquid crystal (FLC) mode. Examples of liquid crystals used in such a drive mode include nematic liquid crystals and smectic liquid crystals. Nematic liquid crystals are generally used in IPS mode and FFS mode, and smectic liquid crystals are generally used in FLC mode.

The IPS mode applies an electrically controlled birefringence (ECB) effect in which a nematic liquid crystal that has been oriented to have a homogeneous molecular alignment with no electric field applied thereto. The nematic liquid crystal is allowed to respond in an electric field that is produced between a pixel electrode and a counter electrode made of metal and is parallel to the substrate (also called an in-plane electric field). More specifically, as described in "Monthly DISPLAY, July" published by Techno Times Co., Ltd., 1997, pp. 83-88 and "EKISHO, Vol. 2, No. 4" published by Japanese Liquid Crystal Society, 1998, pp. 303-316, for example, a normally black system includes: upper and lower polarizing plates in a crossed configuration; and a liquid crystal cell whose initial alignment direction coincides with the direction of the absorption axis of the polarizing plate on one side. When no electric field is applied to such a system, the transmittance is small so that black is displayed. When a certain electric field is applied to such a system, the liquid crystal molecule is rotated while being parallel to the substrate so that the transmittance increases depending on the rotation angle, and white is displayed. As used herein, IPS mode is intended to include super in-plane switching (S-IPS) mode and advanced super in-plane switching (AS-IPS) mode, which employ a V-shaped electrode, a zigzag electrode, or the like.

The FFS mode applies an electrically controlled birefringence (ECB) effect in which a nematic liquid crystal that has been oriented to have a homogeneous molecular alignment with no electric field applied thereto. The nematic liquid crystal is allowed to respond in a parabolic electric field and in another electric field, for example, which is produced between a pixel electrode and a counter electrode made of a transparent electrically-conductive material and is parallel to the substrate. Such electric fields in the FFS mode are also called fringe electric fields. The fringe electric fields may be produced using a pixel electrode and a counter electrode made of a transparent electrically-conductive material, the distance between which is set narrower than that between the upper and lower substrates (cell gap). More specifically, as described in Society for Information Display (SID), 2001, Digest, pp. 484-487 and JP-A No. 2002-031812, for example, a normally black system includes: upper and lower polarizing plates in a crossed configuration; and a liquid crystal cell whose initial alignment direction coincides with the absorption axis of the polarizing plate on one side. When no electric field is applied to such a system, the transmittance is small so that black is displayed. When a certain electric field is applied to such a system, the liquid crystal molecule is rotated while being parallel to the substrate so that the transmittance increases depending on the rotation angle, and white is displayed. As used herein, FFS mode is intended to include advanced fringe field switching (A-FFS) mode and ultra fringe field switching (U-FFS) mode, which employ a V-shaped electrode, a zigzag electrode, or the like.

The FLC mode applies the properties of a ferroelectric chiral smectic liquid crystal that exhibits two stable molecular alignment states when sealed between electrode substrates each with a thickness of about 1 µm to 2 µm. In the FLC mode, the liquid crystal molecule is rotated parallel to the substrate and allowed to respond, when a voltage is applied. In this mode, black and white can be displayed based on the same principle as the IPS or FFS mode desried above. The FLC mode is characterized in that its response speed is higher than that of other driving modes. As used herein, the FLC mode is intended to include surface stabilized FLC(SS-FLC) mode, anti-ferroelectric FLC (AFLC) mode, polymer stabilized FLC (PS-FLC) mode, and V-shaped property FLC (V-FLC) mode.

The liquid crystal molecule that is oriented to have a homogeneous molecular alignment refers to a liquid crystal molecule in such a state that the director of the liquid crystal molecule is oriented or aligned uniformly and parallel to the substrate plane as a result of the interaction between the oriented substrate and the liquid crystal molecule. As used herein, the term "homogeneous molecular alignment" is intended to include cases where the director of the liquid crystal molecule is slightly tilted relative to the substrate plane, namely cases where the liquid crystal molecule has a pre-tilt. When the liquid crystal molecule has a pre-tilt, the pre-tilt angle is preferably 10° or less, more preferably more than 0° and not more than 5°. If the pre-tilt angle is in the above range, liquid crystal displays with a high level of contrast ratio can be obtained.

The nematic liquid crystal may be of any appropriate type, depending on the purpose. For example, the nematic liquid crystal may have positive or negative dielectric anisotropy. The difference between the ordinary refractive index (no) and the extraordinary refractive index (ne) of the nematic liquid crystal, namely, a birefringence of the nematic liquid crystal is preferably from 0.05 to 0.30, in general.

The smectic liquid crystal may be of any appropriate type, depending on the purpose. Preferably, the smectic liquid crystal has an asymmetric carbon atom in part of its molecular structure and exhibits ferroelectricity (which is also called a ferroelectric liquid crystal). Examples of the ferroelectric smectic liquid crystal include p-desiloxybenzylidene-p'-amino-2-methylbutyl cinnamate, p-hexyloxybenzylidene-p'-amino-2-chloropropyl cinnamate, and 4-o-(2-methyl)-butyl-resorcilidene-4'-octylaniline.

The liquid crystal cell may have any appropriate cell gap (distance between the substrates), which is chosen depending on the purpose. The cell gap is preferably from 1.0 µm to 7.0 µm. Using a liquid crystal cell with a cell gap in the above range, liquid crystal displays with relatively short response time can be obtained.

First Anisotropic Optical Element

As stated above, the first anisotropic optical element of the liquid crystal panel of the invention satisfies $nx_1>ny_1>nz_1$, wherein $nx_1$ represents the refractive index in the in-plane slow axis direction, $ny_1$ represents the refractive index in the in-plane fast axis direction, and $nz_1$ represents the refractive index in the thickness direction. In some cases, such a retardation film is called "negative biaxial plate."

The first anisotropic optical element preferably satisfies formulae 1 and 2 below.

$$90 \text{ nm} < Re_1 < 140 \text{ nm} \quad \text{(formula 1)}$$

$$1.1 < NZ_1 < 1.7 \quad \text{(formula 2)},$$

(wherein $Re_1$ is a front retardation expressed by the formula $Re_1=(nx_1-ny_1)d_1$, and $NZ_1=(nx_1-nz_1)/(nx_1-ny_1)$. $d_1$ represents the thickness of the first anisotropic optical element.)

Unless otherwise stated, refractive indices, retardation values and so on shown in the present application are values measured at a temperature of 23° C. and at a wavelength of 590 nm.

The first anisotropic optical element for use in an embodiment of the invention preferably has a front retardation $Re_1$ of 95 to 140 nm, more preferably 100 to 130 nm, particularly preferably 105 to 120 nm.

The $NZ_1$ value is preferably from 1.15 to 1.6, more preferably from 1.2 to 1.55, particularly preferably from 1.25 to 1.5.

The first anisotropic optical element for use in an embodiment of the invention preferably further satisfies formula 6 below.

$$120 \text{ nm} < (nx_1-nz_1)d_1 < 170 \text{ nm} \quad \text{(formula 6)}.$$

Herein, the thickness direction retardation $Rth_1$ of the first anisotropic optical element is defined as above $(nx_1-nz_1)d_1$, and the $Rth_1$ is preferably from 125 to 165 nm, more preferably from 130 to 160 nm, particularly preferably from 135 to 155 nm.

It should be noted that according to the respective definitions, $Re_1$, $Rth_1$ and $NZ_1$ satisfy formula 7 below.

$$Rth_1=Re_1 NZ_1 \quad \text{(formula 7)}$$

When the optical properties of the first anisotropic optical element are in the above range, dark-state light leakage at oblique viewing angles of the liquid crystal display, particularly, at a viewing angle of 45° (an azimuth angle of 45°, 135°, 225°, or 315°) from the absorption axis of the polarizing plate can be reduced, so that the contrast may be increased.

The first anisotropic optical element may be made of any material by any method, as long as the above optical properties can be attained. The first anisotropic optical element may be a single retardation film or a laminate of two or more retardation films. Preferably, the first anisotropic optical element is a single retardation film, so that deviation or unevenness of the retardation value caused by contraction stress of the polarizer or by heat from a light source can be reduced and that a thin liquid crystal panel can be formed. When the first anisotropic optical element is a laminate, it may contain a pressure-sensitive adhesive layer(s) or an adhesive layer(s) for bonding two or more retardation films together. When the laminate includes two or more retardation films, these retardation films may be the same or different.

The optical properties of the retardation film for use in the first anisotropic optical element may be appropriately selected depending on the number of the retardation films to be used. For example, when a single retardation film is used to form the first anisotropic optical element, the front retardation and the thickness direction retardation of the retardation film are preferably set equal to the front retardation $Re_1$ and the thickness direction retardation $Rth_1$ of the first anisotropic optical element, respectively. Therefore, the retardation value of a pressure-sensitive adhesive layer, an adhesive layer or the like for use in placing the first anisotropic optical element on the polarizer or the second anisotropic optical element is preferably as small as possible.

The entire thickness of the first anisotropic optical element is preferably from 10 to 500 µm, more preferably from 20 to 400 µm, most preferably from 30 to 300 µm. When the first anisotropic optical element has a thickness in such a range, it may have good handleability during production, and a liquid crystal display with high optical uniformity may be provided.

The retardation film for use in the first anisotropic optical element preferably has a high level of transparency, mechanical strength, thermal stability, and water blocking ability and is preferably less susceptible to distortion-induced optical unevenness. A stretched polymer film comprising a thermoplastic resin as a main component is preferably used as the retardation film. As used herein, the term "stretched film" refers to a plastic film that is produced by applying a tensile force to an unstretched film at an appropriate temperature or further applying a tensile force to a pre-stretched film at an appropriate temperature so that the molecular orientation is increased in a specific direction.

The retardation film preferably has a transmittance of 80% or more, more preferably 85% or more, particularly preferably 90% or more, as measured with light at a wavelength of 590 nm. Although the theoretical upper limit of the light transmittance is 100%, the practicable upper limit of the light transmittance is approximately 94% due to surface reflection caused by a difference in refractive index between the air and the film. The whole of the first anisotropic optical element also preferably has the same level of transmittance.

The absolute value of the photoelastic coefficient of the retardation film is preferably $1.0 \times 10^{-12}$ m$^2$/N or less, more preferably $5.0 \times 10^{-11}$ m$^2$/N or less, even more preferably $3.0 \times 10^{-11}$ m$^2$/N or less, particularly preferably $1.0 \times 10^{-11}$ m$^2$/N or less. When the photoelastic coefficient is in the above range, a liquid crystal display can be obtained which has a high level of optical uniformity and durability and is less susceptible to changes in optical properties even in high-temperature or high-humidity environments and so on. The lower limit of the photoelastic coefficient is generally, but not limited to, $5.0 \times 10^{-13}$ m$^2$/N or more, preferably $1.0 \times 10^{-12}$ m$^2$/N or more. If the photoelastic coefficient is too small, the ability to produce retardation may tend to be poor, so that it may be difficult to set the front retardation Re$_1$ in the range indicated by formula 1 above. While the photoelastic coefficient is a value specific to the chemical structure of a polymer or the like, the photoelastic coefficient can be controlled to be low by copolymerizing or mixing two or more components having photoelastic coefficients with different sings (positive and negative).

The thickness of the retardation film may be appropriately selected depending on the material used to form the retardation film or depending on the laminated structure of the anisotropic optical element. When a single retardation film is used to form the first anisotropic optical element, the thickness of the retardation film is preferably from 10 to 250 µm, more preferably from 20 to 200 µm, even more preferably 30 to 150 µm. In such a thickness range, the retardation film may exhibit a high level of mechanical strength and display uniformity.

The polymer film comprising the above thermoplastic resin as a main component may be obtained by any appropriate forming method, and, for example, such an appropriate method may be selected from compression molding, transfer molding, injection molding, extrusion molding, blow molding, powder molding, FRP molding, and solvent casting. Among these processes, extrusion molding or solvent casting is preferably used, so that a retardation film having high smoothness and good optical uniformity can be obtained. More specifically, the extrusion molding method for producing a film may include heating and melting a resin composition containing a thermoplastic resin as a main component, a plasticizer, an additive, and so on, extruding it though a T-die or the like onto the surface of a casting roll to form a thin film, and cooling the film. The solvent casting method for producing a film may include dissolving, in a solvent, a resin composition containing a thermoplastic resin as a main component, a plasticizer, an additive, and so on to form a thick solution (dope), degassing the thick solution, uniformly casting the solution onto the surface of a metallic endless belt, a rotary drum, a plastic substrate, or the like to form a thin film, and evaporating the solvent. The forming conditions may be appropriately selected depending on the composition and type of the resin to be used, the forming method, and so on.

While any appropriate material may be used to form the thermoplastic resin, a polymer having positive birefringence is preferably used to form the thermoplastic resin for the purpose of obtaining a negative biaxial plate satisfying the property nx$_1$>ny$_1$>nz$_1$.

As used herein, the term "having positive birefringence" means that when a polymer is oriented by stretching or the like, it has a relatively high refractive index in the orientation direction, and this may apply to many polymers. Examples of polymers having positive birefringence include polycarbonate resins, polyvinyl alcohol resins, fatty acid esters of cellulose, such as triacetyl cellulose, diacetyl cellulose, tripropionyl cellulose, and dipropionyl cellulose, cellulose resins such as cellulose ethers, polyester resins such as polyethylene terephthalate and polyethylene naphthalate, polyarylate resins, polyimide resins, cyclic polyolefin (polynorbornene) resins, polysulfone resins, polyethersulfone resins, polyamide resins, and polyolefin resins such as polyethylene and polypropylene. These polymers may be used singly or in combination of two or more thereof. These polymers may also be modified by copolymerization, branching, crosslinking, molecular terminal modification (or capping), stereoregularity modification, or the like, before use.

If necessary, the polymer film comprising the thermoplastic resin as a main component may further contain any appropriate additive. Examples of such an additive include a plasticizer, a thermal stabilizer, a light stabilizer, a lubricant, an antioxidant, a UV absorber, a flame retardant, a colorant, an antistatic agent, a compatibilizing agent, a crosslinking agent, a thickener, and so on. The type and amount of the additive to be used may be appropriately selected depending on the purpose. The amount of the additive to be used is typically 10 parts by weight, based on 100 parts by weight of the total solids of the polymer film. If the amount of the additive is too large, the film may be reduced in transparency, or the additive may bleed out of the surface of the film.

Any appropriate stretching method may be employed to form the stretched polymer film. Examples of stretching methods include machine-direction uniaxial stretching, transverse-direction uniaxial stretching, machine- and transverse-directions sequential biaxial stretching, machine- and transverse-directions simultaneous biaxial stretching, and so on. Any appropriate stretching machine such as a roll stretching machine, a tenter stretching machine, a pantograph- or linear motor-type biaxial stretching machine may be used as stretching means. When stretching is performed under heating, the temperature may be changed in a continuous or stepwise manner. The stretching process may be divided into two or more stages. In terms of obtaining a biaxial retardation film, transverse-direction uniaxial stretching, machine- and transverse-directions sequential biaxial stretching, or machine- and transverse-directions simultaneous biaxial stretching may be preferably used.

A polymer having positive birefringence has a relatively high refractive index in the orientation direction as described above. Therefore, a film formed by a transverse-direction uniaxial stretching method has a slow axis in a direction perpendicular to the film feeding direction, namely, the width direction of the film (in other words, the refractive index in the width direction is nx$_1$). A film formed by a machine- and transverse-directions sequential biaxial stretching method or a machine- and transverse-directions simultaneous biaxial stretching method may have a slow axis in any of the feed direction and the width direction, depending on the ratio between the machine- and transverse-directions stretching ratios. Specifically, if the stretching ratio is relatively high in the machine direction (feed direction), the slow axis will be in the machine direction (feed direction), while if the stretching ratio is relatively high in the transverse direction (width direction), the slow axis will be in the transverse direction (width direction).

Which of the film feed direction and the film thickness direction should be selected for the slow axis to be formed by stretching depends on the structure of the liquid crystal panel. If the slow axis of the first anisotropic optical element needs to be parallel to the slow axis of the second anisotropic optical element, the preparation should preferably be performed so that both slow axis directions can coincide with each other. Specifically, if the second anisotropic optical element has a slow axis in the film feed direction, the first anisotropic optical element should also preferably have a slow axis in the film feed direction, and if the second anisotropic optical element has a slow axis in the film width direction, the first anisotropic optical element should also preferably have a slow axis in the film width direction. If the slow axis directions are controlled in such a manner, both films may be laminated in a roll-to-roll method to form a laminate having slow axes parallel to each other, which results in high productivity.

In the process of stretching the polymer film, the temperature inside the stretching oven (also called the stretching temperature) is preferably near the glass transition temperature (Tg) of the polymer film. Specifically, it is preferably from Tg–10° C. to Tg+30° C., more preferably from Tg to Tg+25° C., even more preferably from Tg+5° C. to Tg+20° C. If the stretching temperature is too low, the retardation value or the slow axis direction may be uneven in the width direction, or the film may often tend to be crystallized (clouded). If the stretching temperature is too high, the film may be molten, or the development of a retardation may tend to be insufficient. The stretching temperature is typically from 110° C. to 200° C. The glass transition temperature may be determined by the DSC method according to JIS K 7121 (1987).

The specific method for controlling the temperature inside the stretching oven may be appropriately selected from, but not limited to, heating or temperature controlling methods using an air circulation type thermostatic oven with circulated hot or cold air; a heater utilizing microwave, far infrared rays or the like; a roll heated for temperature control; a heat pipe roll; or a metal belt.

The stretching ratio in the process of stretching the polymer film may be determined from the composition of the polymer film, the type of the volatile component or the like, the residual amount of the volatile component or the like, the retardation value to be designed, or the like. For example, the stretching ratio to be used is preferably, but not limited to, from 1.05 to 5.00. The feed speed during stretching is preferably, but not limited to, from 0.5 to 20 m/minute, in view of the mechanical accuracy, stability or the like of the stretching machine.

Besides the above, a commercially available optical film may also be used, without any modification, as the retardation film for use in the first anisotropic optical element. Alternatively, a commercially available optical film may be subjected to secondary processing such as stretching and/or relaxation before use.

[Second Anisotropic Optical Element]

As stated above, the second anisotropic optical element satisfies $nz_2 > nx_2 > ny_2$, wherein $nx_2$ represents the refractive index in the in-plane slow axis direction, $ny_2$ represents the refractive index in the in-plane fast axis direction, and $nz_2$ represents the refractive index in the thickness direction. In some cases, such a retardation film is called "positive biaxial plate" or the like.

The second anisotropic optical element preferably satisfies formulae 3 and 4 below.

$$10 \text{ nm} < Re_2 < 70 \text{ nm} \quad \text{(formula 3)}$$

$$80 \text{ nm} < (nz_2-ny_2)d_2 < 120 \text{ nm} \quad \text{(formula 4)},$$

(wherein $Re_2$ is a front retardation defined by the formula $Re_2=(nx_2-ny_2)d_2$, and $d_2$ represents the thickness of the second anisotropic optical element.)

The second anisotropic optical element for use in an embodiment of the invention preferably has a front retardation $Re_2$ of 15 to 65 nm, more preferably 20 to 60 nm, particularly preferably 25 to 55 nm, most preferably 30 to 50 nm. The $(nz_2-ny_2)d_2$ value is preferably from 85 to 115 nm, more preferably from 90 to 110 nm.

It should also be noted that the $(nz_2-ny_2)d_2$ value satisfies formula 8 below, when the thickness direction retardation $Rth_2$ of the second anisotropic optical element is defined as $(nx_2-nz_2)d_2$.

$$(nz_2-ny_2)d_2=Re_2-Rth_2 \quad \text{(formula 8)}.$$

When the optical properties of the second anisotropic optical element are in the above range, dark-state light leakage at oblique viewing angles of the liquid crystal display, particularly, at a viewing angle of 45° (an azimuth angle of 45°, 135°, 225°, or 315°) from the absorption axis of the polarizing plate can be reduced, so that the contrast can be increased.

In the liquid crystal panel of the invention, the front retardation $Re_1$ of the first anisotropic optical element and the front retardation $Re_2$ of the second anisotropic optical element preferably satisfy formula 5 below.

$$120 \text{ nm} < Re_1 + Re_2 < 160 \text{ nm} \quad \text{(formula 5)}$$

The sum of $Re_1$ and $Re_2$ is more preferably from 125 to 155 nm, even more preferably from 130 to 150 nm, particularly preferably from 135 to 145 nm.

As described above, the first and second anisotropic optical elements are arranged so that their slow axes are parallel to each other, and therefore, if a laminate of the first and second anisotropic optical elements is assumed to be a single laminated retardation film, the sum of $Re_1$ and $Re_2$ may be substantially equal to the front retardation of the laminated retardation film.

The second anisotropic optical element may be made of any material by any method, as long as the above optical properties can be attained. The second anisotropic optical element may be a single retardation film or a laminate of two or more retardation films. Preferably, the second anisotropic optical element is a single retardation film, so that deviation or unevenness of the retardation value caused by the contraction stress of the polarizer or the heat of the light source can be reduced and that a thin liquid crystal panel can be formed. When the second anisotropic optical element is a laminate, it may contain a pressure-sensitive adhesive layer(s) or an adhesive layer(s) for bonding two or more retardation films together. When the laminate includes two or more retardation films, these retardation films may be the same or different.

The optical properties of the retardation film for use in the second anisotropic optical element may be appropriately selected depending on the number of the retardation films to be used. For example, when a single retardation film is used to form the second anisotropic optical element, the front retardation and the thickness direction retardation of the retardation film are preferably set equal to the front retardation $Re_2$ and the thickness direction retardation $Rth_2$ of the second anisotropic optical element, respectively. Therefore, the retardation value of a pressure-sensitive adhesive layer, an adhesive layer or the like for use in placing the second anisotropic optical element on the polarizer or the second anisotropic optical element is preferably as small as possible.

Like the retardation film for use in the first anisotropic optical element, the retardation film for use in the second anisotropic optical element preferably has a high level of transparency, mechanical strength, thermal stability, and water blocking ability and is preferably less susceptible to distortion-induced optical unevenness. A stretched polymer film comprising a thermoplastic resin as a main component is preferably used as the retardation film. The thickness, transmittance, and photoelastic coefficient of such a film and the method for forming such a film are preferably, but not limited to, in the same range as described for the first anisotropic optical element.

While any appropriate material may be used to form the thermoplastic resin, a polymer having negative birefringence is preferably used to form the thermoplastic resin for the purpose of obtaining a positive biaxial plate satisfying the property $nz_2 > nx_2 > ny_2$.

As used herein, the term "having negative birefringence" means that when a polymer is oriented by stretching or the like, it has a relatively low refractive index in the orientation direction, in other words, it has a relatively high refractive index in a direction perpendicular to the orientation direction. For example, such a polymer has a chemical bond or functional group with high polarizability anisotropy, such as an aromatic or carbonyl group, which is introduced in the side chain of the polymer. Examples of such a polymer include acrylic resins, styrene resins, and maleimide resins.

For example, the acrylic resins, styrene resins, or maleimide resins may be obtained by a production method including performing addition polymerization of an acrylic monomer, a styrene monomer, a maleimide monomer, or the like. After the polymerization, the birefringence properties may also be controlled by a side-chain substitution reaction, a maleimidation reaction or a grafting reaction.

Examples of the acrylic resins include poly(methyl methacrylate) (PMMA), poly(butyl methacrylate) and poly(cyclohexyl methacrylate).

Examples of styrene monomers as raw material monomers for the styrene resins include styrene, α-methylstyrene, o-methylstyrene, p-methylstyrene, p-chlorostyrene, p-nitrostyrene, p-aminostyrene, p-carboxystyrene, p-phenylstyrene, 2,5-dichlorostyrene, and p-t-butylstyrene.

Examples of raw material monomers for the maleimide resins include N-ethylmaleimide, N-cyclohexylmaleimide, N-phenylmaleimide, N-(2-methylphenyl)maleimide, N-(2-ethylphenyl)maleimide, N-(2-propylphenyl)maleimide, N-(2-isopropylphenyl)maleimide, N-(2,6-dimethylphenyl) maleimide, N-(2,6-dipropylphenyl)maleimide, N-(2,6-diisopropylphenyl)maleimide, N-(2-methyl-6-ethylphenyl)maleimide, N-(2-chlorophenyl)maleimide, N-(2,6-dichlorophenyl), N-(2-bromophenyl)maleimide, N-(2,6-dibromophenyl)maleimide, N-(2-biphenyl)maleimide, and N-(2-cyanophenyl)maleimide and the like. For example, the maleimide monomers are available from Tokyo Chemical Industry Co., Ltd.

Any other monomer for improvement of the brittleness, formability, heat resistance, and so on may be copolymerized to form the polymer exhibiting negative birefringence. Examples of other monomers used for such purposes include ethylene, propylene, 1-butene, 1,3-butadiene, 2-methyl-1-butene, 2-methyl-1-pentene, 1-hexene, acrylonitrile, methyl acrylate, methyl methacrylate, maleic anhydride, and vinyl acetate.

When the polymer exhibiting negative birefringence is a copolymer of a styrene monomer and any other monomer, the content of the styrene monomer is preferably from 50 to 80% by mole. When the polymer exhibiting negative birefringence is a copolymer of a maleimide monomer and any other monomer, the content of the maleimide monomer is preferably from 2 to 50% by mole. If the content of the monomer component is in the above range, films with high toughness or formability can be produced.

In particular, a styrene-maleic anhydride copolymer, an acrylonitrile copolymer, a styrene-(meth)acrylate copolymer, a styrene-maleimide copolymer, a vinyl ester-maleimide copolymer, or an olefin-maleimide copolymer is preferably used as the polymer exhibiting negative birefringence. These may be used alone or in combination of two or more thereof. These polymers exhibit a high ability to develop negative birefringence and have high heat resistance. For example, these polymers are available from NOVA Chemicals Japan Ltd. and Arakawa Chemical Industries, Ltd.

A polymer having a repeating unit represented by formula (I) below is also preferably used as the polymer exhibiting negative birefringence. Such a polymer may be obtained using, as a starting material maleimide monomer, an N-phenyl-substituted maleimide, in which a phenyl group having a substituent at least in the ortho position is introduced as an N-substituent. Such a polymer has a higher level of negative birefringence and good heat resistance and mechanical strength.

[Formula 1]

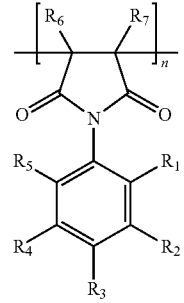

(I)

In formula (I), $R_1$ to $R_5$ each independently represent hydrogen, a halogen atom, a carboxylic acid group, a carboxylic ester group, a hydroxyl group, a nitro group, or a straight or branched chain alkyl or alkoxy group of 1 to 8 carbon atoms, provided that $R_1$ and $R_5$ are not simultaneously hydrogen atoms, $R_6$ and $R_7$ each represent a hydrogen atom or a straight or branched chain alkyl or alkoxy group of 1 to 8 carbon atoms, and n represents an integer of 2 or more.

The polymer exhibiting negative birefringence is not limited to the above, and, for example, a cyclic olefin copolymer as disclosed in JP-A No. 2005-350544 may also be used. The composition disclosed in JP-A No. 2005-156862 or 2005-227427, which contains a polymer and inorganic fine particles, may also preferably be used. A single polymer having negative birefringence may be used alone, or two or more polymers each having negative birefringence may be used in combination. Any of these polymers may also be modified by copolymerization, branching, crosslinking, molecular terminal modification (or capping), stereo-regularity modification, or the like, before use.

If necessary, the polymer film comprising the thermoplastic resin as a main component may further contain any appropriate additive as described above for the first anisotropic optical element.

As described above for the first anisotropic optical element, any appropriate stretching method may be used to form the stretched polymer film.

A polymer having negative birefringence has a relatively low refractive index in the orientation direction as described above. Therefore, a film formed by a transverse-direction uniaxial stretching method has a slow axis in the film feed direction (in other words, the refractive index in the feed direction is $nx_1$). A film formed by a machine- and transverse-directions sequential biaxial stretching method or a machine- and transverse-directions simultaneous biaxial stretching method may have a slow axis in any of the feed direction and the width direction, depending on the ratio between the machine- and transverse-directions stretching ratios. Specifically, if the stretching ratio is relatively high in the machine direction (feed direction) direction, the slow axis will be in the transverse direction (width direction), while if the stretching ratio is relatively high in the transverse direction (width direction), the slow axis will be in the machine direction (feed direction).

The stretching temperature, the method for controlling the temperature inside the stretching oven, the stretching ratio, and so on are preferably the same as, but not limited to, those described above for the first anisotropic optical element.

The method described above for obtaining a positive biaxial plate for use in the second anisotropic optical element employs a polymer having negative birefringence. Alternatively, the positive biaxial plate may be produced using a polymer having positive birefringence.

For example, the positive biaxial plate may be obtained using a polymer having positive birefringence and using a stretching method for increasing the refractive index in the thickness direction as disclosed in JP-A No. 2000-231016, 2000-206328, or 2002-207123. Specifically, the positive biaxial plate satisfying the property $nz_2 > nx_2 > ny_2$ may be obtained by a process including: laminating a heat-shrinkable film to one or both sides of a film comprising a polymer having positive birefringence; and performing a heat treatment so that the film comprising the polymer having positive birefringence is allowed to shrink under the action of the shrinkage force of the heat-shrinkable film and that the refractive index in the thickness direction is increased by allowing the film to shrink in both the machine- and transverse-directions.

As described above, the positive biaxial plate for use as the second anisotropic optical element may be produced using any of a polymer having positive birefringence and a polymer having negative birefringence. In general, the use of the positive birefringence polymer is advantageous in that many types of polymers can be selected, while the use of the negative birefringence polymer is advantageous in that the stretching method allows easy production of a retardation film with high uniformity of the slow axis direction, as compared with the use of the positive birefringence polymer.

Besides the above, a commercially available optical film may also be used, without any modification, as the retardation film for use in the second anisotropic optical element. Alternatively, a commercially available optical film may be subjected to secondary processing such as stretching and/or relaxation before use.

[The Polarizer]

The polarizer is intended to include a film capable of converting natural light or polarized light into any type of polarized light. The polarizer for use in an embodiment of the invention preferably converts natural light or polarized light into linearly polarized light, while it may be any appropriate type of polarizer.

In the liquid crystal panel of the invention, polarizers used as the first and second polarizes may have any appropriate thickness. The thickness of the polarizers is typically from 5 to 80 µm, preferably from 10 to 50 µm, more preferably from 20 to 40 µm. In the above range, the polarizers can have a high level of optical properties and mechanical strength.

The transmittance of the polarizer at a wavelength of 440 nm (also referred to as the single-piece transmittance) is preferably 41% or more, more preferably 43% or more. The theoretical upper limit of the single-piece transmittance is 50%. The degree of polarization is preferably from 99.8 to 100%, more preferably from 99.9% to 100%. In the above range, the polarizer can produce a higher level of contrast in the normal direction when used in a liquid crystal display.

The single-piece transmittance and the degree of polarization may be measured using a spectrophotometer. A specific method for determining the degree of polarization may include measuring the parallel transmittance (H0) and crossed transmittance (H90) of the polarizer and determining the degree of polarizer according to the formula: degree of polarization (%)=$\{(H0-H90)/(H0+H90)\}^{1/2} \times 100$, wherein the parallel transmittance (H0) is the transmittance value of a parallel laminated polarizer which is prepared by laminating two pieces of the same polarizer so that their absorption axes can be parallel to each other, and the crossed transmittance (H90) is the transmittance value of an orthogonal laminated polarizer which is prepared by laminating two pieces of the same polarizer so that their absorption axes can be perpendicular to each other. It should be noted that these transmittances are Y values which have undergone luminosity correction in the two-degree visual field (C illuminant) according to JIS Z 8701 (1982).

In an embodiment of the invention, any appropriate type of polarizer may be used depending on the purpose. For example, the polarizer may be a product produced by the steps of absorbing a dichroic material such as iodine or a dichroic dye to a hydrophilic polymer film such as a polyvinyl alcohol film, a partially-formalized polyvinyl alcohol film, or a partially-saponified ethylene-vinyl acetate copolymer film and uniaxially stretching the film or may be a polyene-based oriented film such as a dehydration product of polyvinyl alcohol or a dehydrochlorination product of polyvinyl chloride. Examples of polarizers that may be used also include an O-type, guest-host polarizer as disclosed in U.S. Pat. No. 5,523,863 in which a liquid crystalline composition containing a dichroic substance and a liquid crystalline compound is oriented in a certain direction, and an E-type polarizer as disclosed in U.S. Pat. No. 6,049,428 in which a lyotropic liquid crystal is oriented in a certain direction.

Among such polarizers, a polarizer comprising a polyvinyl alcohol-based film containing iodine is preferably used, because it has a high degree of polarization. Polyvinyl alcohol or a derivative thereof may be used as a material to form a polyvinyl alcohol-based film suitable for use in the polarizer. Examples of the polyvinyl alcohol derivative include polyvinyl formal, polyvinyl acetal, and those modified with an olefin such as ethylene and propylene, an unsaturated carboxylic acid such as acrylic acid, methacrylic acid and crotonic acid, an alkyl ester thereof, acrylamide, or the like. The polyvinyl alcohol generally has a degree of polymerization of from about 1000 to about 10000 and a saponification degree of from about 80 to about 100% by mole.

The polyvinyl alcohol-based film may contain any additive such as a plasticizer. Examples of the plasticizer include polyols and condensation products thereof, such as glycerol, diglycerol, triglycerol, ethylene glycol, propylene glycol, and polyethylene glycol. While the plasticizer may be used in any amount, the content of the plasticizer in the polyvinyl alcohol-based film is preferably 20% by weight or less.

In accordance with conventional methods, the polyvinyl alcohol-based film (unstretched film) is subjected to at least a uniaxial stretching, and an iodine dyeing treatment. In addition, a boric acid treatment and/or a potassium iodide treatment may be performed. The processed polyvinyl alcohol-based film (stretched film) may be dried according to conventional methods so that a finished polarizer can be obtained.

In the uniaxial stretching step, any stretching method, for example, any of a wet stretching method and a dry stretching method may be used. Examples of dry stretching methods include stretching between rolls, heating roll stretching, and compression stretching. The stretching may be performed in a multistage manner. In the dry stretching method, the unstretched film is generally heated. In general, unstretched film having a thickness of approximately 30 to 150 μm is used. While the film may be stretched at any proper stretching ratio depending on purpose, the stretching ratio (total stretching ratio) may be from about 2 to about 8, preferably from 3 to 6.5, more preferably from 3.5 to 6. The stretched film preferably has a thickness of 5 to 40 μm.

The iodine dyeing treatment may be performed by immersing the polyvinyl alcohol-based film in the iodine solution containing iodine and potassium iodide. The iodine solution is generally an aqueous iodine solution which contains iodine and potassium iodide as an auxiliary agent. While the iodine may be at any concentration, the iodine concentration may be from about 0.01 to about 1% by weight, preferably from 0.02 to 0.5% by weight. While the potassium iodide may be at any concentration, the potassium iodide concentration may be from about 0.01 to about 10% by weight, preferably from 0.02 to 8% by weight.

In the iodine dyeing treatment, the iodine solution generally has a temperature of from about 20 to about 50° C., preferably from 25 to 40° C. The immersion time period is generally from about 10 to about 300 seconds, preferably from 20 to 240 seconds. In the iodine dyeing treatment, the conditions including the concentration of the iodine solution and the temperature and/or time period of the immersion of the polyvinyl alcohol-based film in the iodine solution may be controlled such that the contents of iodine and potassium in the polyvinyl alcohol-based film can be in the above ranges, respectively. The iodine dyeing treatment may be performed at any stage before the uniaxial stretching step, during the uniaxial stretching step, or after the uniaxial stretching step.

The boric acid treatment may be performed by immersing the polyvinyl alcohol-based film in an aqueous boric acid solution. The concentration of boric acid in the aqueous boric acid solution may be from about 2 to about 15% by weight, preferably from 3 to 10% by weight. The aqueous boric acid solution may contain potassium ion and iodine ion derived from potassium iodide. The concentration of potassium iodide in the aqueous boric acid solution may be from about 0.5 to about 10% by weight, preferably from 1 to 8% by weight. Using the aqueous boric acid solution containing potassium iodide, a so-called neutral gray polarizer can be produced which is less colored or substantially uniform in absorbance over substantially the entire range of visible light wavelengths.

In the potassium iodide treatment, iodine containing aqueous solution such as using potassium iodide is preferably used. The potassium iodide concentration of the solution is generally from about 0.5 to about 10% by weight, preferably from 1 to 8% by weight. The process temperature is generally the range of from 15 to 60° C., preferably from 25 to 40° C. The immersion time period is generally from about 1 to about 120 seconds, preferably from 3 to 90 seconds. The potassium iodide treatment may be performed at any stage before the drying step. It can be performed after the washing step mentioned later.

The polarizer may contain zinc. Containing zinc in a polarizer is preferable, because a hue deterioration of a polarizing plate in high temperature conditions may be repressed. The zinc content in the polarizer may be controlled in the range approximately 0.002 through 2% by weight, and preferably 0.01 through 1% by weight. When the zinc content is in the above range, a durability of the polarizer may be improved and deterioration of hue may be repressed.

A zinc salt solution is used in the zinc impregnation. Examples of the zinc salt include zinc halide such as zinc chloride and zinc iodide, zinc sulfate, and zinc acetate. Zinc sulfate is preferably used as a zinc salt, because it has high retention in a polarizer. Alternatively, a wide variety of zinc complexes may be used in the impregnation. A zinc ion concentration in the zinc salt solution is preferably about 0.1 through 10% by weight, more preferably 0.3 through 7% by weight. The zinc salt solution is preferably used in the form of an aqueous solution containing potassium ion and iodine ion derived from potassium iodide or the like, because such a solution can facilitate the impregnation of zinc ions. A potassium iodide concentration is preferably 0.5 through 10% by weight, and more preferably 1 through 8% by weight.

In the zinc impregnation, the zinc salt solution generally has a temperature of from about 15 to about 85° C., preferably from about 25 to about 70° C. The immersion time period is generally from about 1 to about 120 seconds, preferably from 3 to 90 seconds. In the zinc impregnation, a zinc content of the polyvinyl alcohol-based film can be controlled by adjusting the conditions including the concentration of the zinc salt solution and the temperature and/or time period of the immersion of the polyvinyl alcohol-based film in the zinc salt solution. The zinc impregnation may be performed at any stage, for example, before the iodine dyeing, after the iodine dyeing and before the immersion in the aqueous boric acid solution, during the boric acid treatment, or after the boric acid treatment. The zinc impregnation and the iodine dyeing may be performed at the same time using the zinc salt present in the iodine dyeing solution. The zinc impregnation is preferably performed together with the boric acid treatment. The uniaxial stretching step may be performed together with the zinc impregnation. The zinc impregnation may be performed plural times.

The processed polyvinyl alcohol-based film (stretched film) may be subjected to a water-washing step and a drying step according to conventional methods.

The water washing step is generally performed by immersing the polyvinyl alcohol-based film in purified water such as ion-exchange water and distilled water. The water washing temperature is generally from 5 to 50° C., preferably from 10 to 45° C., more preferably from 15 to 40° C. The immersion time period is generally from about 10 to about 300 seconds, preferably from about 20 to about 240 seconds.

The drying step may be performed using any appropriate drying method such as natural drying, blow drying, or drying by heating. In the case of drying by heating, for example, the drying temperature is typically from 20 to 80° C., preferably from 25 to 70° C., and in general, the drying time is preferably from about 1 to about 10 minutes. After the drying, the water content of the polarizer is preferably from 10 to 30% by weight, more preferably from 12 to 28% by weight, even more preferably from 16 to 25% by weight. If the water content is too high, the degree of polarization may tend to be reduced as the polarizer is dried in the process of drying a laminate of the polarizer and the optical element or an isotropic film, which are bonded with an adhesive layer interposed therebetween (namely in the process of drying a polarizing plate). In such a case, the crossed transmittance may increase particularly in a short wavelength range of 500 nm or less, namely, the short wavelength light may leak, so that black image may tend to be tinted blue. On the other hand, if the water content of the polarizer is too low, a problem such as being prone to form defects of local irregularities (knick defects) may occur.

In the liquid crystal panel of the invention, the first and second polarizers may be the same or different.

[Isotropic Optical Element]

The liquid crystal panel of the invention may include any medium placed between the liquid crystal 10 and the second polarizer 20'. It is preferred that such a medium should be optically isotropic so that it will not substantially change the polarization of light passing through in any of the normal direction of the liquid crystal panel and oblique directions. Specifically, it refers to a medium whose refractive index distribution satisfies $nx_3=ny_3=nz_3$, wherein $nx_3$ is its refractive index in the in-plane slow axis direction, $ny_3$ is its refractive index in the in-plane fast axis direction, and $nz_3$ is its refractive index in the thickness direction. In the description, it is intended to include not only a case where $nx_3$, $ny_3$ and $nz_3$ are completely equal to one another but also a case where $nx_3$, $ny_3$ and $nz_3$ are substantially equal to one another. For example, the "case where $nx_3$, $ny_3$ and $nz_3$ are substantially equal to one another" is intended to include a case where the in-plane retardation $Re_3$ expressed by $(nx_3-ny_3)d_3$ and the thickness direction retardation $Rth_3$ expressed by $(nx_3-nz_3)d_3$ are each 10 nm or less.

Such an optically isotropic medium may be a pressure-sensitive adhesive layer or adhesive layer for integrating the second polarizer 20' and the liquid crystal cell 10 into a laminate. Specifically, in an embodiment, the second polarizer 20' and the liquid crystal cell 10 may be laminated using a pressure-sensitive adhesive layer or an adhesive layer without any other optical element such as another film interposed therebetween. In such an embodiment, the liquid crystal panel can be reduced in thickness or weight and reduced in the number of films, which is advantageous in terms of cost.

Figure 2:
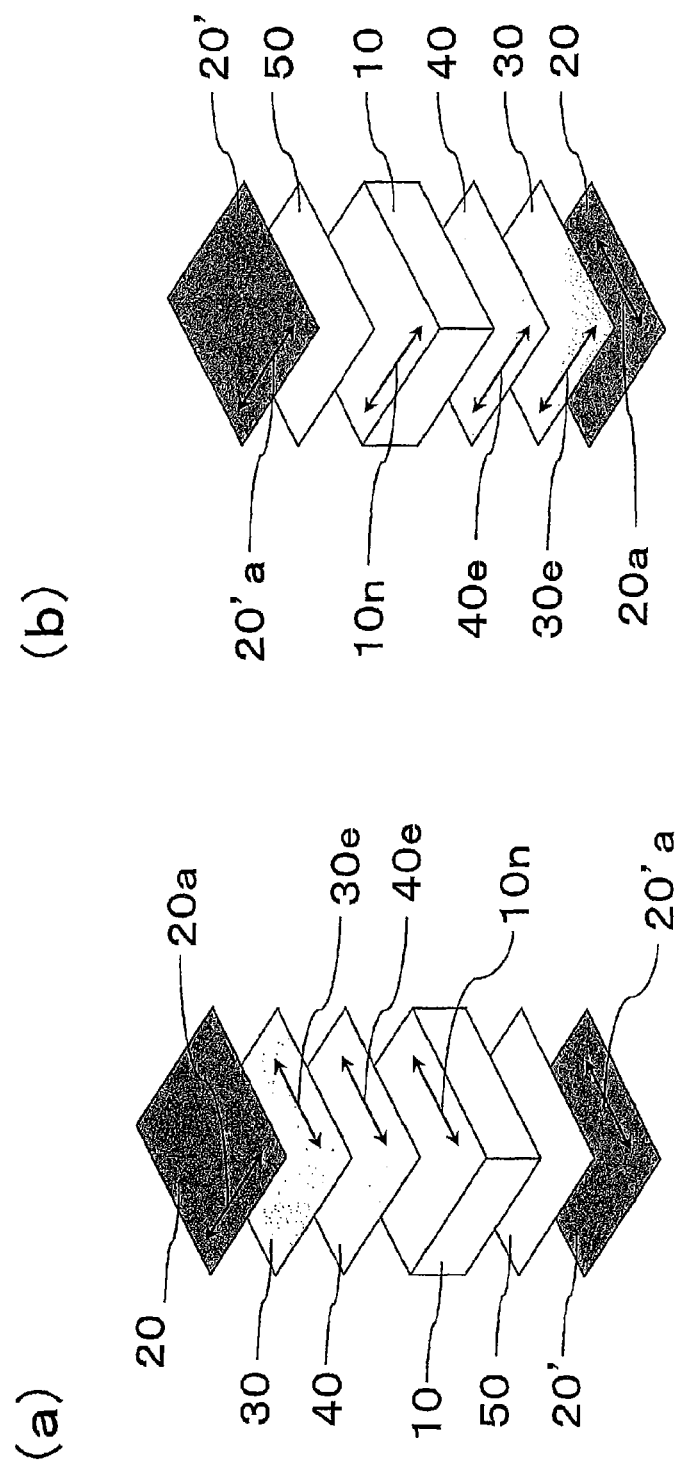
FIG. 2(a) is a schematic perspective view showing a case where the liquid crystal panel employs O-mode.
FIG. 2(b) is a schematic perspective view showing a case where the liquid crystal panel employs E-mode.

As shown in FIG. 1 and FIGS. 2(*a*) and 2(*b*), an isotropic optical element 50 may also be placed as the medium between the liquid crystal cell 10 and the second polarizer 20'. In such a structure, the isotropic optical element functions as a protective film on the liquid crystal cell side of the polarizer to prevent degradation of the polarizer, so that the display characteristics of the liquid crystal panel can be kept at a high level for a long time.

In a preferred embodiment, an isotropic optical element may also be provided as the optically isotropic medium between the liquid crystal cell 10 and the second polarizer 20'. Such an isotropic optical element refers to an element that does not substantially change the polarization of light passing through in any of the normal direction of the liquid crystal panel and oblique directions, and is intended to include an element having an in-plane retardation $Re_3$ of 10 nm or less and a thickness direction retardation $Rth_3$ of 10 nm or less, wherein the thickness direction retardation $Rth_3$ is expressed by $(nx_3-nz_3) d_3$.

The front retardation $Re_3$ of the isotropic optical element for use in an embodiment of the invention is preferably as small as possible. $Re_3$ is preferably 5 nm or less, more preferably 3 nm or less.

The $Rth_3$ of the isotropic optical element is also preferably as small as possible. $Rth_3$ is preferably 7 nm or less, more preferably 5 nm or less.

When $Re_3$ and $Rth_3$ are each set in the above range, the liquid crystal display can have high contrast in oblique directions. In addition, black image can be prevented from being tinted yellow, when the liquid crystal display is viewed from oblique directions.

The isotropic optical element may be produced using any material and method that can satisfy the above optical properties. The isotropic optical element may be a single optical film or a laminate of two or more optical films. Preferably, the isotropic optical element is a single film, so that the generation of birefringence and unevenness caused by the contraction stress of the polarizer or the heat of the light source can be reduced and that a thin liquid crystal panel can be formed. When the isotropic optical element is a laminate, it may contain a pressure-sensitive adhesive layer(s) or an adhesive layer(s) for bonding two or more retardation films together. When the laminate includes two or more retardation films, these retardation films may be the same or different. For example, when two retardation films are laminated, the respective retardation films are preferably arranged so that their slow axes are perpendicular to each other. Such an arrangement can make the in-plane retardation small. It is also preferred that a film having a positive thickness-direction retardation and a film having a negative thickness-direction retardation should be laminated. Such lamination allows a small thickness-direction retardation.

Like the retardation film for use in the first and second anisotropic optical elements, the optical film for use in the isotropic optical element preferably has a high level of transparency, mechanical strength, thermal stability, and water blocking ability and is preferably less susceptible to distortion-induced optical unevenness. A polymer film is preferably used as such a film. The thickness and transmittance of such a film and the method for forming such a film are preferably, but not limited to, in the same range as described for the first anisotropic optical element.

The absolute value of the photoelastic coefficient of the optical film for use in the isotropic optical element is preferably $1.0\times10^{-10}$ m$^2$/N or less, more preferably $5.0\times10^{-11}$ m$^2$/N or less, even more preferably $1.0\times10^{-11}$ m$^2$/N or less, particularly preferably $5.0\times10^{-12}$ m$^2$/N or less. When the photoelastic coefficient is in the above range, a liquid crystal display can be obtained which has a high level of optical uniformity and high durability and is less susceptible to changes in optical properties even in high-temperature or high-humidity environments and so on. The lower limit of the photoelastic coefficient is generally, but not limited to, $5.0\times10^{-13}$ m$^2$/N or more. The photoelastic coefficient can be controlled to be low by the same method as described above for the first anisotropic optical element.

The optical film for use in the isotropic optical element is preferably an optically isotropic film. The term "optically isotropic film" refers to a film that does not substantially change the polarization of light passing through in any of the normal direction and oblique directions, as described above for the isotropic optical element.

Examples of materials used to form the optically isotropic film include polycarbonate resins, polyvinyl alcohol resins, cellulose resins, polyester resins, polyarylate resins, polyimide resins, cyclic polyolefin resins, polysulfone resins, polyethersulfone resins, polyolefin resins, polystyrene resins, polyvinyl alcohol resins, and any blend thereof. Thermosetting or ultraviolet-curable resins such as urethane, acrylic urethane, epoxy, or silicone resins may also be used. Like the first and second anisotropic optical elements, the optically isotropic film may also contain any appropriate additive or additives.

The cellulose resin is preferably an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred. Much commercially available triacetyl celluloses are placing on sale and are advantageous in view of easy availability and cost. In many case, a thickness direction retardation of triacetyl cellulose film exceeds 10 nm, however, a cellulose resin film having relatively small thickness direction retardation as well as low front retardation may be obtained by using additives which can negate the retardation or by employing adequate film processing. Examples of the processing method include a method that includes laminating a general cellulose resin film to a base film such as a polyethylene terephthalate, polypropylene, or stainless steel film, coated with a solvent such as cyclopentanone or methyl ethyl ketone, drying the laminate by heating (for example, at 80 to 150° C. for 3 to 10 minutes) and then separating the base film; and a method that includes coating a general cellulose resin film with a solution of a norbornene resin, a (meth)acrylic resin or the like in a solvent such as cyclopentanone or methyl ethyl ketone, drying the coated film by heating (for example, at 80 to 150° C. for 3 to 10 minutes), and then separating the coating.

The cellulose resin film with a relatively small thickness direction retardation to be used may be a fatty acid cellulose resin film with a controlled degree of fat substitution. While triacetyl cellulose for general use has a degree of acetic acid substitution of about 2.8, preferably, the degree of acetic acid substitution is controlled to 1.8 to 2.7, so that the Rth can be reduced. The Rth may also be controlled to be low by adding a plasticizer such as dibutyl phthalate, p-toluenesulfonanilide, and acetyl triethyl citrate, to the fatty acid-substituted cellulose resin. The plasticizer is preferably added in amount of 40 parts by weight or less, more preferably of 1 to 20 parts by weight, still more preferably of 1 to 15 parts by weight, to 100 parts by weight of the fatty acid cellulose resin.

Examples of optically isotropic films that may be used also include a polymer film containing a resin composition containing a thermoplastic resin having a substituted and/or unsubstituted imide group in the side chain and another thermoplastic resin having a substituted and/or unsubstituted phenyl and nitrile groups in the side chain as disclosed in JP-A No. 2001-343529 (WO01/37007); a polymer film containing a lactone ring structure-containing acrylic resin as disclosed in JP-A Nos. 2000-230016, 2001-151814, 2002-120326, 2002-254544, 2005-146084, and 2006-171464; a polymer film containing an acrylic resin having an alkyl unsaturated carboxylate structure unit and a glutaric anhydride structure unit as disclosed in JP-A Nos. 2004-70290, 2004-70296, 2004-163924, 2004-292812, 2005-314534, 2006-131898, 2006-206881, 2006-265532, 2006-283013, 2006-299005, and 2006-335902; and a film containing a thermoplastic resin having a glutarimide structure as disclosed in JP-A Nos. 2006-309033, 2006-317560, 2006-328329, 2006-328334, 2006-337491, 2006-337492, 2006-337493, and 2006-337569. These films are preferred, because they have a low retardation in both the front and thickness directions and a low photoelastic coefficient, so that they are less susceptible to defects even when the polarizing plate is distorted by heating or the like, and because they have low moisture permeability, so that they can have high durability against humidity.

A cyclic polyolefin resin is also preferably used for the optically isotropic film. A preferable example of the cyclic polyolefin resin is a norbornene resin. Cyclic polyolefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

[How to Arrange Each Optical Member]

A description is given below of how to arrange and laminate the liquid crystal cell, the first and second anisotropic optical elements, the isotropic optical element, and the polarizers.

How to Arrange First Anisotropic Optical Element and (Laminating them with Optically Isotropic Film Interposed Therebetween)

Referring to FIG. 1 and FIGS. 2(a) and 2(b), the first anisotropic optical element 30 is placed between the first polarizer 20 and the second anisotropic optical element 40. An optically isotropic film may be provided as a polarizer protecting film between the first anisotropic optical element 30 and the first polarizer 20. When the first anisotropic optical element 30 and the first polarizer are laminated with the optically isotropic film interposed therebetween, the first anisotropic optical element and the optically isotropic film are preferably laminated with an adhesive or pressure-sensitive adhesive layer interposed therebetween, and the optically isotropic film and the first polarizer are preferably laminated with an adhesive or pressure-sensitive adhesive layer interposed therebetween.

The thickness of the adhesive is generally in the range of 0.1 to 50 μm, preferably in the range of 0.1 to 20 μm, particularly preferably in the range of 0.1 to 10 μm. The thickness of the pressure-sensitive adhesive is generally in the range of 1 to 100 μm, preferably in the range of 5 to 80 μm, particularly preferably in the range of 10 to 50 μm.

Any appropriate adhesive or pressure-sensitive adhesive may be used to form the adhesive or pressure-sensitive adhesive layer. For example, the adhesive or pressure-sensitive adhesive to be used may be appropriately selected from adhesives containing, as a base polymer, an acrylic polymer, a silicone polymer, polyester, polyurethane, polyamide, polyvinyl ether, a vinyl acetate/vinyl chloride copolymer, modified polyolefin, an epoxy polymer, a fluoropolymer, or rubber such as natural rubber or synthetic rubber. In particular, an aqueous adhesive is preferably used for the lamination of the first polarizer and the optically isotropic film serving as a polarizer protecting film. An adhesive comprising a polyvinyl alcohol resin as a main component is particularly used.

Particularly when a low water-vapor permeability resin such as a polycarbonate resin, a polyester resin, a polyarylate resin, a polyimide resin, a cyclic polyolefin resin, a polysulfone resin, a polyethersulfone resin, a polyolefin resin, or a polystyrene resin is used for the optically isotropic film to be placed between the first anisotropic optical element and the first polarizer, a resin solution containing a polyvinyl alcohol-type resin, a crosslinking agent and a metal compound colloid with an average particle size of 1 to 100 nm is preferably used as an adhesive for the lamination of the first polarizer and the optically isotropic film serving as a polarizer protecting film so that the formation of defects of irregularities can be suppressed. In general, drying is performed after the polarizer and the optically isotropic film serving as a polarizer protecting film are bonded through an adhesive layer, but in this process, defects of irregularities (knicks) tend to occur. In liquid crystal displays, defects of irregularities tend to affect the visibility in such a manner that light leakage may be observed.

Examples of the polyvinyl-type alcohol resin for use in such an adhesive include a polyvinyl alcohol resin and an acetoacetyl group-containing polyvinyl alcohol resin. An acetoacetyl group-containing polyvinyl alcohol resin is preferred, because it can form a polyvinyl alcohol-based adhesive having a highly reactive functional group and can improve the durability of the polarizing plate.

Examples of polyvinyl alcohol-based resin include: a polyvinyl alcohol obtained by saponifying a polyvinyl acetate; a derivative thereof; a saponified copolymer of vinyl acetate and a monomer copolymerizable therewith; and polyvinyl alcohols modified by acetalization, urethanization, etherification, grafting, phosphate esterification and the like. Examples of the monomers include, unsaturated carboxylic acids such as maleic acid (anhydride), fumaric acid, crotonic acid, itaconic acid and (meth) acrylic acid, and esters thereof; α-olefins such as ethylene and propylene; (meth)allylsulfonic acid or sodium salt thereof, (meth)allylsulfonate; sodium sulfonate (monoalkyl maleate), sodium disulfonate (alkyl maleate); N-methylolacrylamide; an alkai salt of acrylamide alkylsulfonate; N-vinylpyrrolidone, a derivative of N-vinylpyrrolidone and the like. The polyvinyl alcohol-based resins can be either used alone or in combination of two kinds or more.

While no specific limitation is imposed on a polyvinyl alcohol-based resin, an average degree of polymerization is from about 100 to about 5000, preferably from 1000 to 4000 and an average degree of saponification is from about 85 to about 100 mol %, preferably from 90 to 100 mol % in consideration of adherence.

A polyvinyl alcohol-based resin having an acetoacetyl group is obtained by reacting a polyvinyl alcohol-based resin and diketene to each other with a known method. Examples of known methods include: a method in which a polyvinyl alcohol-based resin is dispersed into a solvent such as acetic acid, to which diketene is added and a method in which a polyvinyl alcohol-based resin is previously dissolved into a solvent such as dimethylformamide or dioxane, to which diketene is added. Another example is a method in which diketene gas or diketene liquid is brought into direct contact with a polyvinyl alcohol.

No specific limitation is imposed on a degree of modification by an acetoacetyl group in a polyvinyl alcohol-based resin having an acetoacetyl group or groups as far as the degree of modification is 0.1 mol % or more. If the degree of modification is less than 0.1 mol %, water resistance of an adhesive layer is insufficient, which is improper. A degree of modification by an acetoacetyl group is preferably from about 0.1 to about 40 mol %, more preferably from 2 to 7 mol %. If a degree of modification by an acetoacetyl group exceeds 40 mol %, reaction sites with a crosslinking agent is fewer to thereby reduce an effect of improvement on moisture resistance and heat resistance. The degree of modification by an acetoacetyl group can be determined by NMR.

Any of crosslinking agents that have been used in a polyvinyl alcohol-based adhesive can be used as a crosslinking agent in the invention without a specific limitation thereon. A crosslinking agent that can be used is a compound having at least two functional groups having reactivity with a polyvinyl alcohol-based resin. Examples thereof include: alkylene diamines having an alkylene group and two amino groups such as ethylene diamine, triethylene diamine and hexamethylene diamine; isocyanates such as tolylene diisocyanate, hydrogenated tolylene diisocyanate, trimethylolpropane tolylene diisocyanate adduct, triphenylmethane triisocyanate, methylenebis(4-phenylmethane) triisocyanate and isophorone diisocyanate, and ketoxime-blocked products thereof or isocyanates of phenol-blocked products; epoxy compounds such as ethylene glycol diglycidyl ether, polyethylene glycol diglycidyl ether, glycerin di- or triglicydyl ether, 1,6-hexanediol diglycidyl ether, trimethylolpropane triglycidyl ether, diglicidyl aniline and diglycidyl amine; monoaldehydes such as formaldehyde, acetaldehyde, propionaldehyde and butylaldehyde; dialdehydes such as glyoxal, malonaldehyde, succindialdehyde, glutardialdehyde, maleic dialdehyde and phthaldialdehyde; amino-formaldehyde resins such as condensates with formaldehyde of methylolurea, methylolmelamine, alkylated methylolurea, alkylated methylolmelamine, acetoguanamine and benzoguanamine; salts of divalent metals or trivalent metals such as sodium, potassium, magnesium, calcium, aluminum, iron and nickel, and oxides of the metals. In particular, amino-formaldehyde resins and dialdehydes are preferred. Amino-formaldehyde resins preferably include methylol group-containing compounds, and dialdehydes preferably include glyoxal. Methylolmelamine, a methylol group-containing compound, is particularly preferred.

While the amount of the crosslinking agent to be blended may be appropriately determined depending on the type of the polyvinyl alcohol-based resin and the like used in the adhesive, it is generally from about 10 to about 60 parts by weight, preferably from 20 to 50 parts by weight, based on 100 parts by weight of the polyvinyl alcohol-based resin. In such ranges, good adhesion properties can be obtained.

In order to improve durability of the polarizing plate, a polyvinyl alcohol-based resin having an acetoacetyl group may be used. Also in this case, the crosslinking agent may be used in an amount of 10 to 60 parts by weight, preferably in an amount of about 20 to about 50 parts by weight, similarly to the above, based on 100 parts by weight of the polyvinyl alcohol-based resin. If the amount of the crosslinking agent to be blended is too large, the reaction of the crosslinking agent can proceed within a short time so that the adhesive can tend to form a gel, and as a result, the adhesive can have an extremely short pot life and thus can be difficult to use industrially. From these points of view, the crosslinking agent is used in the above amount, but the resin solution according to the invention can be stably used even when the amount of the crosslinking agent is large as mentioned above, because the resin solution contains the colloidal metal compound.

The colloidal metal compound is a dispersion of fine particles in a dispersion medium and can have permanent stability, because the fine particles are electrostatically stabilized by the repulsion between the fine particles charged with the same type of charge. The colloidal metal compound (fine particles) has an average particle size of 1 to 100 nm. If the average particle size of the colloid is in this range, the metal compound can be almost uniformly dispersed in the adhesive layer so that knicks can be prevented, while adhesive properties can be ensured. The average particle size in this range is considerably smaller than the wavelength in the visible light range. Thus, the metal compound has no harmful effect on the polarization properties, even when the transmitted light is scattered by the metal compound in the formed adhesive layer. The average particle size of the colloidal metal compound is preferably from 1 to 100 nm, more preferably from 1 to 50 nm.

The colloidal metal compound to be used may be of various types. Examples of the colloidal metal compound include colloidal metal oxides such as colloidal alumina, colloidal silica, colloidal zirconia, colloidal titania, colloidal aluminum silicate, colloidal calcium carbonate, and colloidal magnesium silicate; colloidal metal salts such as colloidal zinc carbonate, colloidal barium carbonate and colloidal calcium phosphate; and colloidal minerals such as colloidal celite, colloidal talc, colloidal clay, and colloidal kaolin.

The colloidal metal compound may exist in the form of a colloidal solution, in which the colloidal metal compound is dispersed in a dispersion medium. The dispersion medium is generally water. Besides water, any other dispersion medium such as alcohols may also be used. The concentration of the colloidal metal compound solid in the colloidal solution is generally, but not limited to, from about 1 to about 50% by weight, more generally from 1 to 30% by weight. The colloidal metal compound to be used may contain a stabilizing agent of an acid such as nitric acid, hydrochloric acid and acetic acid.

The colloidal metal compound is electrostatically stabilized and may be classified into a positively charged one and a negatively charged one, while the colloidal metal compound is a non-electrically-conductive material. The positive charge and the negative charge are distinguished depending on the state of the colloidal surface charge in the solution after the preparation of the adhesive. For example, the charge of the colloidal metal compound may be determined by measuring the zeta potential with a zeta potential meter. The surface charge of the colloidal metal compound generally varies with pH. Thus, the charge of the colloidal solution state according to the invention is influenced by the controlled pH of the adhesive solution. The pH of the adhesive solution is generally set in the range of 2 to 6, preferably in the range of 2.5 to 5, more preferably in the range of 3 to 5, still more preferably in the range of 3.5 to 4.5. In the invention, the colloidal metal compound having a positive charge is more effective in reducing the occurrence of knicks than the colloidal metal compound having a negative charge. Examples of the colloidal metal compound having a positive charge include colloidal alumina, and colloidal titania. In particular, colloidal alumina is preferred.

The colloidal metal compound is added in an amount of 200 parts by weight or less (in solid weight) to 100 parts by weight of the polyvinyl alcohol-based resin. If the amount ratio of the colloidal metal compound is in the above range, the occurrence of knicks can be reduced, while the adhesion between the polarizer and the protective film can be ensured. The amount ratio of the colloidal metal compound is preferably from 10 to 200 parts by weight, more preferably from 20 to 175 parts by weight, still more preferably from 30 to 150 parts by weight. If the amount ratio of the colloidal metal compound is excess, adhesion properties may get worse. If the amount ratio is lower, a prevention of knicks may not be effective.

The adhesive is generally used as an aqueous solution. While the resin solution may have any concentration, it preferably has a concentration of 0.1 to 15% by weight, more preferably of 0.5 to 10% by weight, in view of coatability, shelf stability and the like.

The viscosity of the resin solution, which is used as the adhesive, is preferably, but not limited to, from 1 to 50 mPa·s. In the bonding of a polarizer and an optically isotropic film serving as a polarizer protecting film, the occurrence of knicks tends to increase as the viscosity of a resin solution decreases. Using the above adhesive composite, however, the occurrence of knicks can be prevented even in a low viscosity range such as the range of 1 to 20 mPa·s, and thus the occurrence of knicks can be prevented regardless of the viscosity of the resin solution. Polyvinyl alcohol-based resin having an acetoacetyl groups cannot have high degree of polymerization in contrast to other general polyvinyl alcohol resins, and therefore they are used at a low viscosity as mentioned above. Using the above adhesive composite, however, knicks, which would otherwise be caused by the low viscosity of the resin solution, can be prevented from occurring even when the polyvinyl alcohol-based resin having an acetoacetyl group is being used.

The resin solution for use as the adhesive for polarizing plate may be prepared by any method. In general, the resin solution may be prepared by a process that includes mixing the polyvinyl alcohol-based resin and the crosslinking agent, appropriately adjusting the concentration thereof, and then adding the colloidal metal compound to the mixture. When a polyvinyl alcohol-based resin having an acetoacetyl group may be used as the polyvinyl alcohol-based resin or the crosslinking agent is added in a relatively large amount, the stability of the solution may be taken into account, and therefore the mixing of the polyvinyl alcohol-based resin and the colloidal metal compound may be followed by the addition of the crosslinking agent in consideration of the timing of using the resulting resin solution and so on. The concentration of the resin solution for use as the adhesive for polarizing plate may be adjusted as appropriate, after the resin solution is prepared.

The adhesive for polarizing plate may also contain various types of tackifiers, coupling agents such as silane coupling agents, titanium coupling agents, stabilizing agents such as ultraviolet absorbing agents, antioxidants, heat-resistant stabilizing agents, and hydrolysis-resistant stabilizing agents, and so on. In the invention, the colloidal metal compound, which is a non-electrically-conductive material, may also contain fine particles of an electrically-conductive material.

In the bonding of a polarizer and an optically isotropic film serving as a polarizer protecting film with an adhesive, coating of the adhesive may be performed on one/or both of the optically isotropic film and the polarizer. Coating of the adhesive is preferably conducted so as to achieve a thickness after drying of the order in the range of from 10 to 300 nm. The thickness of the adhesive layer is more preferably from 10 to 200 nm, still more preferably from 20 to 150 nm, in terms of achieving uniform in-plane thickness and sufficient adhesion force. When a resin solution containing a polyvinyl alcohol-type resin, a crosslinking agent and a metal compound colloid with an average particle size of 1 to 100 nm, as described above, is used as an adhesive, the thickness of the adhesive layer is preferably designed to be larger than the average particle size of the colloidal metal compound contained in the adhesive for polarizing plate.

Examples of methods for controlling the thickness of the adhesive layer include, but are not limited to, methods including controlling the solid concentration of the adhesive solution or controlling an adhesive coater. While the thickness of the adhesive layer may be measured by any method, cross-sectional observation measurement by SEM (Scanning Electron Microscopy) or TEM (Transmission Electron Microscopy) is preferably used. The adhesive may be applied by any process, and various methods such as roll methods, spraying methods, and immersion methods may be used for the application.

The optically isotropic film serving as a polarizer protecting film may be subjected to surface modification treatment before it is applied with the adhesive. Specific examples of such treatment include corona treatment, plasma treatment, primer treatment, saponification treatment or the like in order to increase an affinity of the optically isotropic film for the adhesive, for example.

After the adhesive is coated, the optically isotropic film serving as a polarizer protecting film is adhered to the polarizer with a roll laminator or the like. After the protective films are laminated to both sides of the polarizer, the laminate is preferably dried in an appropriate temperature, from a viewpoint of stability of optical properties such as degree of polarization and hue. The drying step is preferably performed at a drying temperature of 90° C. or less, more preferably of 85° C. or less, still more preferably of 80° C. or less from a viewpoint of optical properties. The lower limit of the drying temperature is preferably, but not limited to, 50° C. or more from a viewpoint of manufacturing efficiency and practicability. The drying temperature may be stepwise changed in the above range.

A pressure-sensitive adhesive is preferably used for the lamination of the first anisotropic optical element and the optically isotropic film serving as a polarizer protecting film. For example, the pressure-sensitive adhesive to be used may be appropriately selected from, but not limited to, pressure-sensitive adhesives containing, as a base polymer, an acrylic polymer, a silicone polymer, polyester, polyurethane, polyamide, polyether, a fluoropolymer, or a rubber polymer. In particular, preferably used is a pressure-sensitive adhesive having a high level of optical transparency, weather resistance and heat resistance and exhibiting an appropriate degree of wettability, cohesiveness and pressure-sensitive adhesive properties, such as an acrylic pressure-sensitive adhesive.

Moreover, a pressure-sensitive adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The pressure-sensitive adhesive layer may contain additives, for example, such as natural or synthetic resins, adhesive resins, glass fibers, glass beads, metal powder, fillers comprising other inorganic powder etc., pigments, colorants and antioxidants. Moreover, it may be a pressure-sensitive adhesive layer that contains fine particle and shows optical diffusion nature.

Proper method may be carried out to attach a pressure-sensitive adhesive layer. As an example, about 10 to about 40 weight % of the pressure-sensitive adhesive solution in which a base polymer or its composition is dissolved or dispersed, for example, toluene or ethyl acetate or a mixed solvent of these two solvents is prepared. A method in which this solution is directly applied on a optical element top or an protecting film top using suitable developing methods, such as flow method and coating method, or a method in which a pressure-sensitive adhesive layer is once formed on a separator, as mentioned above, and is then transferred on a optical element or an protecting film may be mentioned.

A pressure-sensitive adhesive layer may also be prepared on one side or both sides of a polarizing plate or an optical film as a layer in which pressure-sensitive adhesives with different composition or different kind etc. are laminated together. Moreover, when pressure-sensitive adhesive layers are prepared on both sides, pressure-sensitive adhesive layers that have different compositions, different kinds or thickness, etc. may also be used on front side and backside of a polarizing plate or an optical film. Thickness of a pressure-sensitive adhesive layer may be suitably determined depending on a purpose of usage or adhesive strength, etc., and generally is 1 to 500 µm, preferably to 200 µm, and more preferably 1 to 100 µm.

[Lamination without Optically Isotropic Film]

How to laminate the first anisotropic optical element 30 and the first polarizer 20 with the optically isotropic film as a polarizer protecting film interposed therebetween has been specifically described above. Alternatively, in a more preferred embodiment, the first anisotropic optical element 30 and the first polarizer 20 are laminated with an adhesive or pressure-sensitive adhesive layer interposed therebetween without such an optically isotropic film interposed therebetween. Such a structure can reduce the number of films to be used in the liquid crystal panel and reduce the thickness of the liquid crystal panel. Such a structure is also advantageous in terms of manufacturing costs.

An adhesive layer is preferably used for the lamination of the first anisotropic optical element and the first polarizer 20, and the adhesive described above is preferably used as such an adhesive.

[Angle of Arrangement of First Anisotropic Optical Element and First Polarizer]

The first anisotropic optical element and the first polarizer are arranged so that the slow axis of the first anisotropic optical element and the absorption axis of first polarizer are perpendicular or parallel to each other. Particularly in the liquid crystal panel of the invention, they are preferably arranged so that both axes are perpendicular to each other. In a liquid crystal display, such an arrangement can more effectively suppress light leakage in oblique directions.

In such a structure that the slow axis of the first anisotropic optical element and the absorption axis of the first polarizer are arranged perpendicular to each other (hereinafter such an arrangement is also referred to as "crossed arrangement"), the first anisotropic optical element preferably has the slow axis in the film width direction. Polarizers generally used are produced by adsorbing a dichroic material such as iodine to a hydrophilic polymer such as polyvinyl alcohol and uniaxially stretching the polymer, and therefore, they have an absorption axis in the stretching direction. In order to increase the degree of polarization and so on, they are generally produced using machine-direction uniaxial stretching. Therefore, such polarizing plates have an absorption axis in the film feed direction (machine direction). Thus, when the first anisotropic optical element has a slow axis in the film width direction, the polarizer and the first anisotropic optical element may be laminated in a roll-to-roll method, so that the absorption axis of the polarizer and the slow axis of the anisotropic optical element can be arranged perpendicular to each other, which may result in a significant improvement in the productivity and yield.

[How to Arrange Second Anisotropic Optical Element and First Anisotropic Optical Element]

The second anisotropic optical element 40 is placed between the first anisotropic optical element 30 and the liquid crystal cell 10. They are preferably laminated with an adhesive layer or a pressure-sensitive adhesive layer interposed therebetween, particularly preferably with a pressure-sensitive adhesive layer interposed therebetween. The pressure-sensitive adhesive described above for lamination of the first anisotropic optical element and the first polarizer is preferably used as such a pressure-sensitive adhesive.

[Angle of Arrangement of Second Anisotropic Optical Element And First Anisotropic Optical Element]

The second anisotropic optical element and the first anisotropic optical element are arranged so that their slow axes are parallel to each other. Particularly in the liquid crystal panel having the "crossed arrangement," the second anisotropic optical element preferably has a slow axis in the film width direction. When the second anisotropic optical element having a slow axis in the width direction and the first anisotropic optical element having a slow axis in the film width direction as described above are laminated in a roll-to-roll method, their slow axes can be arranged parallel to each other, so that the productivity and yield can be significantly improved.

[How to Arrange Second Polarizer and Isotropic Optical Element]

When the liquid crystal panel of the invention has the isotropic optical element 50, it is placed between the second polarizer 20' and the liquid crystal cell 10. The first lamination is preferably performed with an adhesive or pressure-sensitive adhesive layer interposed therebetween, particularly preferably with an adhesive layer interposed therebetween. The adhesive described above for lamination of the first anisotropic optical element and the first polarizer may be preferably used as such an adhesive.

[Angle of Arrangement of Second Anisotropic Optical Element And First Anisotropic Optical Element]

When $nx_3$ is completely equal to $ny_3$ in the isotropic optical element 50, namely, when the front retardation $Re_a$ is zero, no slow axis is detected, and therefore, the isotropic optical element 50 may be placed regardless of the absorption axis of the polarizer 20'. However, if nx is slightly different from ny, a slow axis may be detected. In such a case, the slow axis of the isotropic optical element is preferably placed parallel or perpendicular to the absorption axis of the polarizer 20'. Such an arrangement makes it possible to keep the front contrast high.

[How to Arrange Liquid Crystal Cell]

The liquid crystal cell 10 is placed between the second anisotropic optical element 40 and the isotropic optical element 50. They are preferably laminated with an adhesive or pressure-sensitive adhesive layer interposed therebetween, particularly preferably with a pressure-sensitive adhesive layer interposed therebetween. The pressure-sensitive adhesive described above for how to arrange the first anisotropic optical element and the first polarizer may be preferably used as such a pressure-sensitive adhesive.

[Angle of Arrangement of Liquid Crystal Cell]

As shown in FIGS. 2(a) and 2(b), the initial alignment direction of the liquid crystal cell 10 is preferably parallel to the absorption axis of the second polarizer 20' in the liquid crystal panel of the invention. In this case, the first and second polarizers may be arranged in an orthogonal (crossed Nicols) configuration to form a normally black mode liquid crystal panel, in which the initial alignment direction of the liquid crystal cell 10 is perpendicular to the absorption axis of the first polarizer 20. In addition, the first anisotropic optical element 30, the second anisotropic optical element 40 and the isotropic optical element 50 may be arranged so that the above arrangement angles can each be attained.

When the second polarizer 20' is placed on the light source side, such a structure forms an "O-mode liquid crystal panel" as shown in FIG. 2(a), because the initial alignment direction of the liquid crystal cell 10 is parallel to the direction of the absorption axis of the polarizer placed on the light source side. On the other hand, when the first polarizer 20 is placed on the light source side, such a structure forms an "E-mode liquid crystal panel" as shown in FIG. 2(b), because the initial alignment direction of the liquid crystal cell 10 is perpendicular to the direction of the absorption axis of the polarizer placed on the light source side.

[Liquid Crystal Panel]

As described above, the liquid crystal panel of the invention may be obtained by arranging the first polarizer 20, the first anisotropic optical element 30, the second anisotropic optical element 40, the liquid crystal cell 10, the isotropic optical element 50, and the second polarizer 20'. In the manufacturing process, it may be formed using a method of sequentially and separately laminating the above members or using a pre-laminate of some of the members. The stacking sequence is not particularly restricted.

Particularly, the liquid crystal panel of the invention can be produced with high quality stability and high assembling workability by a process including previously preparing a first polarizing plate comprising a laminate of the first polarizer 20, the first anisotropic optical element 30 and the second anisotropic optical element 40, previously preparing a second polarizing plate comprising a laminate of the isotropic optical element 50 and the second polarizer 20', and placing each of the first and second polarizing plates on the liquid crystal cell 10. In particular, the first anisotropic optical element, the second anisotropic optical element and the first polarizer are preferably laminated in a roll-to-roll method to form a continuous-sheet laminated polarizing plate, which is preferably used in view of productivity. In order to laminate these films in a roll-to-roll method, the direction of the absorption axis of the polarizer and the direction of the slow axis of the anisotropic optical element should be previously controlled to meet the design of the liquid crystal panel of the invention, and the directions of these axes may be controlled by controlling the stretching direction or the stretching ratio as described previously.

Figure 3:
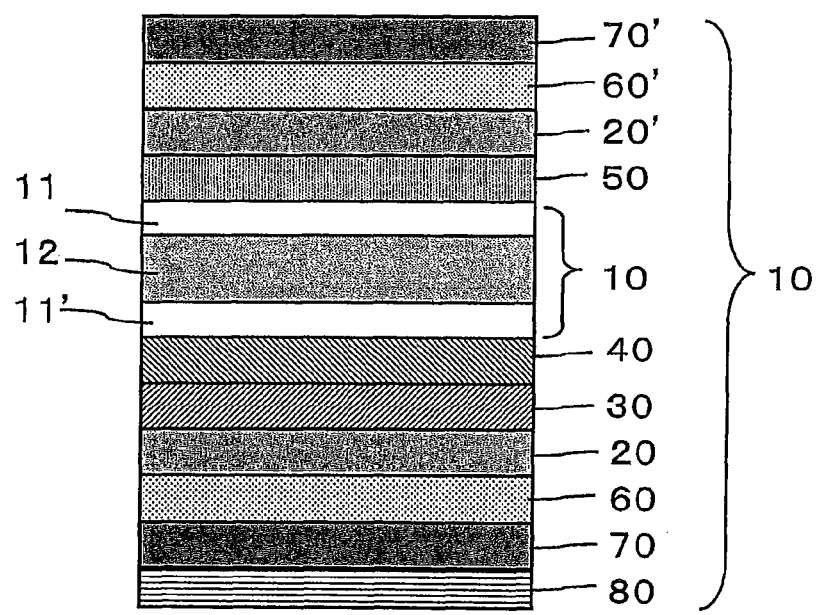
FIG. 3 is a schematic cross-sectional view of a liquid crystal panel according to a preferred embodiment of the invention.

The liquid crystal panel of the invention may also include any optical layer or any member other than the members described above. Examples of such a member include transparent protective layers 60 and 60' provided on a side of the first polarizer 20 where the anisotropic optical element 30 is not placed and on a side of the second polarizer 20' where the isotropic optical element 50 is not placed. In addition, such transparent protective layers may be provided with surface treatment layers 70 and 70' such as anti-reflection layers, anti-sticking layers, diffusion layers, or antiglare layers, respectively. Surface treatment layers may also be provided as additional optical layers independent of the transparent protective layers. FIG. 3 is a cross-sectional view showing an example of the liquid crystal panel having such a laminated structure.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

As shown in FIG. 3, the liquid crystal panel of the invention is also preferably configured to include a brightness enhancement film 80. The brightness enhancement film that may be used is typically, but not limited to, a film having the property of transmitting linearly polarized light with a specific polarization axis and reflecting the other type of light, such as a dielectric multilayer thin film or a multilayer laminate of thin films having different refractive index anisotropies. For example, such a brightness enhancement film may be D-BEF (trade name) manufactured by 3M Company. A cholesteric liquid crystal layer, specifically, an oriented cholesteric liquid crystal polymer film, a product including a base film and such an oriented liquid crystal layer supported thereon, or the like may also be used. These exhibit the property of reflecting one of clockwise circularly polarized light and counterclockwise circularly polarized light and transmitting the other, and examples include PCF350 (trade name) manufactured by Nitto Denko Corporation and Transmax (trade name) manufactured by Merck & Co., Inc.

[Liquid Crystal Display]

The liquid crystal panel is suitable for use in a liquid crystal display such as a personal computer, a liquid crystal television, a cellular phone, or a personal digital assistance (PDA).

Figure 4:
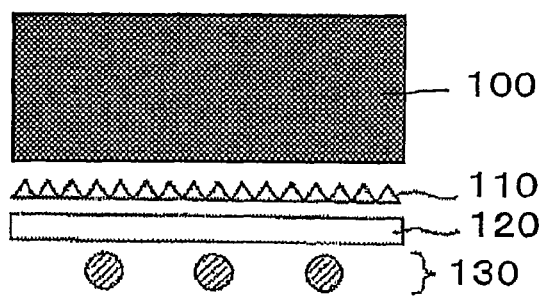
FIG. 4 is a schematic cross-sectional view of a liquid crystal display according to a preferred embodiment of the invention.

FIG. 4 is a schematic cross-sectional view of a liquid crystal display according to a preferred embodiment of the invention. The liquid crystal display includes the liquid crystal panel 100, a prism sheet 110, a light guide plate 120, and a light source 130. In another embodiment, the optical members illustrated in FIG. 4 may be partially omitted or replaced with other optical members, depending on the drive mode or intended use of the liquid crystal cell, as long as the features of the invention are met.

The contrast (YW/YB) of the liquid crystal display having the liquid crystal panel of the invention is preferably from 15 to 200, more preferably from 25 to 200, particularly preferably from 40 to 200 in a direction at an azimuth angle of 45° and a polar angle of 60°.

EXAMPLES

The invention is further described by the examples and comparative examples below. However, such examples are not to be construed as limitations of the invention. The measurement methods used in the examples are described below.

[Retardation Value and Three-Dimensional Refractive Index]

The measurement was performed using a retardation meter KOBRA-WPR (product name, manufactured by Oji Scientific Instruments) based on parallel Nicol rotation method at 23° C. with light at a wavelength of 590 nm. The retardation of the film was measured in the front (normal) direction and measured when the film was inclined by 40°. The refractive index nx in a direction where the in-plane refractive index was maximum, the refractive index ny in a direction perpendicular thereto, and the refractive index nz in the film thickness direction were each calculated from the measured values using the software installed in the system. These values and the thickness (d) were used to determine the in-plane retardation $Re=(nx-ny)d$ and the thickness direction retardation $Rth=(nx-nz)d$. In the measurement of the retardation of the film inclined by 40°, the second optical element film (positive biaxial plate) was inclined around the fast axis, and the other films were inclined around the slow axis. The film thickness necessary for the calculation of the three-dimensional refractive index was measured using a digital micrometer KC-351C model manufactured by Anritsu Company. The refractive index was also measured using an Abbe refractometer (DR-M4 (product name) manufactured by ATAGO CO., LTD.).

[Black-State Brightness of Liquid Crystal Display]

A black image was displayed on the liquid crystal display in a dark room at 23° C., and the brightness (Y value in the XYZ color system) was measured using EZ Contrast 160D (product name) manufactured by ELDIM. The average black-state brightness at a polar angle of 60° and an azimuth angle of 0 to 360° was determined.

Examples of Production of Anisotropic Optical Element

Production Example 1a

Using a tenter stretching machine, a commercially available polymer film (Zeonor Film ZF14-130 (trade name) manufactured by Optes Corporation, 60 μm in thickness, 136° C. in glass transition temperature) composed mainly of a cyclic polyolefin polymer was subjected to end-constraint uniaxial stretching in the width direction (transverse-direction stretching process) at a temperature of 158° C. so that the film width could be 3.0 times the original film width before the machine-direction stretching process. The resulting film was a negative biaxial plate having a fast axis in the feed direction. This negative biaxial plate is named retardation film 30A.

Production of Second Anisotropic Optical Element

Production Example 2a

Using a uniaxial extruder and a T-die, resin pellets of a styrene-maleic anhydride copolymer (DYLARK D232 (product name) manufactured by NOVA Chemicals Japan Ltd.) were extruded at 270° C. into a molten resin sheet, which was cooled on a cooling drum to give a 100 μm thick film. Using a roll stretching machine, the film was subjected to free-end uniaxial stretching in the feed direction at a temperature of 130° C. and a stretching ratio of 1.5 times, so that a retardation film having a fast axis in the feed direction was obtained (machine-direction stretching process). Using a tenter stretching machine, the resulting film was subjected to end-constraint uniaxial stretching in the width direction at a temperature of 135° C. so that the film width could be 1.6 times the width of the film resulting from the machine-direction stretching (transverse-direction stretching process). As a result, a 50 μm thick, biaxially-stretched film was obtained. The resulting film was a positive biaxial plate having a fast axis in the feed direction. This positive biaxial plate is named retardation film 40A.

Production Examples 1B to 1D and 1F to 1I

Using a roll stretching machine, the same cyclic polyolefin polymer film as used in Production Example 1A was subjected to free-end uniaxial stretching in the feed direction, so that a retardation film having a slow axis in the feed direction was obtained (machine-direction stretching process). Using a tenter stretching machine, the resulting film was subjected to end-constraint uniaxial stretching in the width direction, so that a biaxially stretched film was obtained (transverse-direction stretching process). The stretching ratios in the machine- and transverse-directions stretching processes were controlled so that negative biaxial plates having a fast axis in the feed direction were obtained. These negative biaxial plates are named retardation films 30B to 30D and 30F to 30I, respectively.

Production Example 1E

Using a roll stretching machine, the same cyclic polyolefin polymer film as used in Production Example 1A was subjected to free-end uniaxial stretching in the feed direction, so that a retardation film having a slow axis in the feed direction and having a front retardation of 110 nm (positive A plate) was obtained. The positive A plate is named retardation film 30E.

The optical properties of retardation films 30A to 30I obtained in Production Examples 1A to 1I are shown in Table 1. Table 1.

TABLE 1

| Production Example | Retardation Film | $Re_1$ | $Rth_1$ | $Nz_1$ |
|---|---|---|---|---|
| 1A | 30A | 110 | 143 | 1.3 |
| 1B | 30B | 110 | 132 | 1.2 |
| 1C | 30C | 110 | 165 | 1.5 |
| 1D | 30D | 110 | 121 | 1.1 |
| 1E | 30E | 110 | 110 | 1.0 |
| 1F | 30F | 110 | 198 | 1.8 |
| 1G | 30G | 101 | 141.4 | 1.4 |
| 1H | 30H | 150 | 195 | 1.3 |
| 1I | 30I | 85 | 170 | 2.0 |

Production Examples 2B to 2P

Retardation films, which were positive biaxial plates, were obtained as in Production Example 2A, except that the stretching ratios in the machine-direction stretching process and the transverse-direction stretching process were changed. All the resulting films had a fast axis in the feed direction. These negative biaxial plates are named retardation films 40B to 40P, respectively.

The optical properties of retardation films 40A to 40P obtained in Production Examples of 2A to 2P are shown in Table 2. in Table 1.

TABLE 2

| Production Example | Retardation Film | $Re_2$ | $Rth_2$ | $(nz_2 - ny_2) \times d_2$ |
|---|---|---|---|---|
| 2A | 40A | 40 | −70 | 110 |
| 2B | 40B | 30 | −70 | 100 |
| 2C | 40C | 20 | −70 | 90 |
| 2D | 40D | 15 | −80 | 95 |
| 2E | 40E | 15 | −90 | 105 |
| 2F | 40F | 15 | −70 | 85 |
| 2G | 40G | 15 | −100 | 115 |
| 2H | 40H | 40 | −90 | 130 |
| 2I | 40I | 15 | −110 | 125 |
| 2J | 40J | 0 | −70 | 70 |
| 2K | 40K | 15 | −50 | 65 |
| 2L | 40L | 40 | −20 | 60 |
| 2M | 40M | 70 | −70 | 140 |
| 2N | 40N | 0 | −100 | 100 |
| 2O | 40O | 0 | −75 | 75 |
| 2P | 40P | 0 | −175 | 175 |

Production of Polarizer

Production Example 4

A polymer film (9P75R (trade name) manufactured by KURARAY CO., LTD., 75 μm in thickness, 2,400 in average degree of polymerization, 99.9% by mole in degree of saponification) composed mainly of polyvinyl alcohol was stretched and fed, while it was dyed between rolls having different peripheral speeds. First, the polyvinyl alcohol film was stretched to 1.2 times in the feed direction, while it was allowed to swell by immersion in a water bath at 30° C. for 1 minute. Thereafter, the film was stretched in the feed direction to 3 times the original length of the unstretched film, while it was dyed by immersion in an aqueous solution at 30° C. containing 0.03% by weight of potassium iodide and 0.3% by weight of iodine for 1 minute. The film was then stretched to 6 times the original length in the feed direction, while it was immersed for 30 seconds in an aqueous solution at 60° C. containing 4% by weight of boric acid and 5% by weight of potassium iodide. The resulting stretched film was then dried at 70° C. for 2 minutes to give a polarizer. The polarizer had a thickness of 30 μm and a water content of 14.3% by weight.

Production of Adhesive

Production Example 5

Under the condition at a temperature of 30° C., 100 parts by weight of an acetoacetyl group-containing polyvinyl alcohol resin (1,200 in average degree of polymerization, 98.5% by mole in degree of saponification, 5% by mole in degree of acetoacetylation) and 50 parts by weight of methylol melamine were dissolved in pure water to form an aqueous solution with a solids content of 3.7% by weight. An aqueous adhesive solution was prepared by adding, to 100 parts by weight of the aqueous solution, 18 parts by weight of an aqueous solution containing positively-charged colloidal alumina (15 nm in average particle size) at a solid content of 10% by weight. The adhesive solution had a viscosity of 9.6 mPa·s and a pH in the range of 4 to 4.5. The amount of the colloidal alumina was 74 parts by weight, based on 100 parts by weight of the polyvinyl alcohol resin.

Production of First Polarizing Plate

Production Example 6A

The colloidal alumina-containing adhesive of Production Example 5 was applied to one side of an optically isotropic element (FUJITAC ZRF80S (trade name) manufactured by FUJIFILM Corporation) having a thickness 80 μm, an front retardation of 0.1 nm and a thickness direction retardation of 1.0 nm so that an 80 nm thick coating could be formed after drying. The coated element was then placed on one side of the polarizer of Production Example 4 by a roll-to-roll method so that both feed directions could be parallel to each other.

Subsequently, the colloidal alumina-containing adhesive of Production Example 5 was applied to one side of retardation film 1A so that an 80 nm thick coating could be formed after drying, and the coated retardation film 1A was placed on the other side of the polarizer in a roll-to-roll method so that both feed directions could be parallel to each other. The resulting laminate was then dried at 55° C. for 6 minutes to give a polarizing plate.

Retardation film 40A was further placed on the retardation film 30A side of the polarizing plate with an acrylic pressure-sensitive adhesive (15 µm in thickness) interposed therebetween by a roll-to-roll method so that their feed directions could be parallel to each other. As a result, a first polarizing plate 60A was obtained.

Production Examples 6B to 6T and 6V to 6W

First polarizing plates 60B to 60T and 60V to 60W were obtained as in Production Example 6A, except that the retardation films shown in Table 3 were used in place of retardation films 30A and 40A.

Production Example 6U

In a similar manner to Production Example 6A, one side of the optically isotropic element was bonded to one side of the polarizer of Production Example 4 with the colloidal alumina-containing adhesive of Production Example 5 interposed therebetween. Subsequently, the colloidal alumina-containing adhesive of Production Example 5 was applied to one side of retardation film 1E so that an 80 nm thick coating could be formed after drying, and a piece of the coated retardation film 1E was placed on the other side of a piece of the polarizer so that the feed directions of the polarizer and the retardation film 1E could be perpendicular to each other, namely, so that the absorption axis of the polarizer could be perpendicular to the slow axis of the retardation film 30E. As a result, a polarizing plate was obtained.

A piece of retardation film 40A was further placed on the retardation film 30E side of the polarizing plate with an acrylic pressure-sensitive adhesive (15 µm in thickness) interposed therebetween so that the direction of the slow axis of retardation film 1E could be parallel to the direction of the slow axis of retardation film 40A. As a result, a first polarizing plate 60U was obtained.

Production of Second Polarizing Plate

Production Example 7

The colloidal alumina-containing adhesive of Production Example 5 was applied to one side of the same optically isotropic element as used in Production Example 6A so that an 80 nm thick coating could be formed after drying, and the coated element was placed on one side of the polarizer of Production Example 4. The isotropic optical element was also placed on the other side of the polarizer in the same manner and then dried at 55° C. for 6 minutes, so that a polarizing plate was obtained.

Production of Liquid Crystal Panel

Example 1

The liquid crystal panel was taken out of an IPS-mode liquid crystal cell-equipped liquid crystal television (WOO L32-H01 manufactured by Hitachi, Ltd.). The polarizing plates placed on the upper and lower sides of the liquid crystal cell were removed, and the glass surfaces (front and rear) of the liquid crystal cell were cleaned. Subsequently, the second polarizing plate prepared in Production Example 7 was placed on the viewer side surface of the liquid crystal cell with an acrylic pressure-sensitive adhesive (15 µm in thickness) interposed therebetween so that the absorption axis of the polarizer could be parallel to the initial alignment direction of the liquid crystal cell. The first polarizing plate 60A prepared in Production Example 6A was then placed on the light-source side surface of the liquid crystal cell with an acrylic pressure-sensitive adhesive (15 µm in thickness) interposed therebetween so that the direction of the absorption axis of the polarizer could be perpendicular to the initial alignment direction of the liquid crystal cell. As a result, a liquid crystal panel was obtained. The resulting liquid crystal panel was an E-mode liquid crystal panel having the same structure as shown in FIG. 2(b).

The resulting liquid crystal panel was incorporated into the original liquid crystal display, and its brightness during black image was measured 10 minutes after the light source was turned on.

Examples 2 to 13 and Comparative Examples 1 to 11

Liquid crystal panels were obtained as in Example 1, except that first polarizing plates 60B to 60X prepared in production Examples 6B to 6X were used as shown in Table 3 in place of first polarizing plate 60A. Each of the resulting liquid crystal panels was incorporated into the original liquid crystal display and evaluated in the same manner as in Example 1.

Table 3 shows the structure of each of the liquid crystal panels obtained in the examples and the comparative examples and the result of evaluation of the black-state brightness.

TABLE 3

|  | First Optical Element | | | | Second Optical Element | | | Second Polarizer | | Average Black-state Brightness (cd/cm²) |
|---|---|---|---|---|---|---|---|---|---|---|
|  |  | Re₁ (nm) | Rth₁ (nm) | Nz₁ |  | Re₂ (nm) | Rth₂ (nm) | (nz₂ − ny₂) × d₂ (nm) |  | Re₁ + Re₂ (nm) |  |
| Example 1 | 30A | 110 | 143 | 1.3 | 40A | 40 | −70 | 110 | 60A | 150 | 0.297 |
| Example 2 | 30A | 110 | 143 | 1.3 | 40B | 30 | −70 | 100 | 60B | 140 | 0.275 |
| Example 3 | 30A | 110 | 143 | 1.3 | 40C | 20 | −70 | 90 | 60C | 130 | 0.341 |
| Example 4 | 30A | 110 | 143 | 1.3 | 40D | 15 | −80 | 95 | 60D | 125 | 0.365 |
| Example 5 | 30A | 110 | 143 | 1.3 | 40E | 15 | −90 | 105 | 60E | 125 | 0.383 |
| Example 6 | 30A | 110 | 143 | 1.3 | 40F | 15 | −70 | 85 | 60F | 125 | 0.431 |

TABLE 3-continued

|  | First Optical Element | | | Second Optical Element | | | Second Polarizer | Average Black-state |
|---|---|---|---|---|---|---|---|---|
|  | Re₁ (nm) | Rth₁ (nm) | Nz₁ | Re₂ (nm) | Rth₂ (nm) | (nz₂ − ny₂) × d₂ (nm) | Re₁ + Re₂ (nm) | Brightness (cd/cm²) |
| Example 7 | 30A 110 | 143 | 1.3 | 40G 15 | −100 | 115 | 60G 125 | 0.459 |
| Example 8 | 30A 110 | 143 | 1.3 | 40H 40 | −90 | 130 | 60H 150 | 0.626 |
| Example 9 | 30A 110 | 143 | 1.3 | 40I 15 | −110 | 125 | 60I 125 | 0.649 |
| Example 10 | 30B 110 | 132 | 1.2 | 40A 40 | −70 | 110 | 60J 150 | 0.406 |
| Example 11 | 30C 110 | 165 | 1.5 | 40A 40 | −70 | 110 | 60K 150 | 0.281 |
| Example 12 | 30C 110 | 165 | 1.5 | 40C 20 | −70 | 90 | 60L 130 | 0.420 |
| Example 13 | 30D 110 | 121 | 1.1 | 40A 40 | −70 | 110 | 60M 150 | 0.581 |
| Comparative Example 1 | 30A 110 | 143 | 1.3 | 40J 0 | −70 | 70 | 60N 110 | 0.773 |
| Comparative Example 2 | 30A 110 | 143 | 1.3 | 40K 15 | −50 | 65 | 60O 125 | 0.723 |
| Comparative Example 3 | 30A 110 | 143 | 1.3 | 40L 40 | −20 | 60 | 60P 150 | 0.708 |
| Comparative Example 4 | 30A 110 | 143 | 1.3 | 40M 70 | −70 | 140 | 60Q 180 | 1.014 |
| Comparative Example 5 | 30G 101 | 141.4 | 1.4 | 40N 0 | −100 | 100 | 60R 101 | 0.654 |
| Comparative Example 6 | 30G 101 | 141.4 | 1.4 | 40O 0 | −75 | 75 | 60S 101 | 0.897 |
| Comparative Example 7 | 30G 101 | 141.4 | 1.4 | 40P 0 | −175 | 175 | 60T 101 | 2.634 |
| Comparative Example 8 | 30E 110 | 110 | 1 | 40A 40 | −70 | 110 | 60U 150 | 0.822 |
| Comparative Example 9 | 30F 110 | 198 | 1.8 | 40A 40 | −70 | 110 | 60V 150 | 0.762 |
| Comparative Example 10 | 30H 150 | 195 | 1.3 | 40B 30 | 70 | −40 | 60W 180 | 0.765 |
| Comparative Example 11 | 30I 85 | 170 | 2 | 40N 0 | −100 | 100 | 60X 85 | 0.936 |

It is apparent from Examples 1 to 13 that the liquid crystal panel having the first and second anisotropic optical elements and the isotropic optical element arranged according to E-mode as shown in FIG. 2(b) has low black-state brightness in oblique directions, particularly in a direction of 45°, and has high contrast. Taking the polarization conversion by the liquid crystal panel into account, it will also be apparent that even an O-mode liquid crystal panel as shown in FIG. 2(a) can have low black-state brightness in oblique directions.

Taking the results of Example 1 and Comparative Example 1 into account, it is also apparent that when the second anisotropic optical element has a front retardation, the black-state brightness in oblique directions can be reduced.

A continuous-sheet polarizing plate can be obtained by laminating the films by a roll-to-roll method using a combination of the retardation film and the polarizer, which are shown as components of the liquid crystal panel of the invention in the production examples. This indicates that the productivity is high and that the production of the liquid crystal panel is easy.

The invention claimed is:

1. A liquid crystal panel, comprising:
a liquid crystal cell comprising a liquid crystal layer containing a liquid crystal molecule that is oriented in homogeneous alignment when no electric field is applied thereto;
a first polarizer placed on one side of the liquid crystal cell;
a second polarizer placed on another side of the liquid crystal cell;
a first anisotropic optical element placed between the liquid crystal cell and the first polarizer and satisfying $nx_1 > ny_1 > nz_1$; and
a second anisotropic optical element placed between the first anisotropic optical element and the liquid crystal cell and satisfying $nz_2 > nx_2 > ny_2$, wherein:
the slow axis of the first anisotropic optical element is parallel to the slow axis of the second anisotropic optical element, and
$nx_1$ and $nx_2$ represent the refractive indices of the first and second anisotropic optical elements in in-plane slow axis directions thereof, respectively, $ny_1$ and $ny_2$ represent the refractive indices of the first and second anisotropic optical elements in in-plane fast axis directions, respectively, and $nz_1$ and $nz_2$ represent the refractive indices of the first and second anisotropic optical elements in their thickness directions thereof, respectively.

2. The liquid crystal panel of claim 1, wherein the liquid crystal cell is any one of IPS mode, FFS mode and FLC mode.

3. The liquid crystal panel of claim 1, further comprising an optically isotropic medium between the liquid crystal cell and the second polarizer.

4. The liquid crystal panel of claim 1, wherein the slow axis of the first anisotropic optical element is perpendicular to the absorption axis of the first polarizer.

5. The liquid crystal panel of claim 1, wherein the initial alignment direction of the liquid crystal cell is parallel to the direction of the absorption axis of the second polarizer.

6. The liquid crystal panel of claim 1, wherein the first anisotropic optical element satisfies formulae 1 and 2 below, and the second anisotropic optical element satisfies formulae 3 and 4 below:

$$90 \text{ nm} < Re_1 < 140 \text{ nm} \quad \text{(formula 1)}$$

$$1.1 < NZ_1 < 1.7 \quad \text{(formula 2)}$$

$$10 \text{ nm} < Re_2 < 70 \text{ nm} \quad \text{(formula 3)}$$

$$80 \text{ nm} < (nz_2 - ny_2)d_2 < 120 \text{ nm} \quad \text{(formula 4)}$$

(wherein, $Re_1 = (nx_1 - ny_1)d_1$, $Re_2 = (nx_2 - ny_2)d_2$, $NZ_1 = (nx_1 - nz_1)/(nx_1 - ny_1)$, and $d_1$ and $d_2$ represent the thickness of the first anisotropic optical element and the thickness of the second anisotropic optical element, respectively).

7. The liquid crystal panel of claim 6, wherein the first and second anisotropic optical elements further satisfy formula 5 below:

$$120 \text{ nm} < Re_1 + Re_2 < 160 \text{ nm} \quad \text{(formula 5)}.$$

8. The liquid crystal panel of claim 6, wherein the first anisotropic optical element satisfies formula 6 below:

$$120 \text{ nm} < (nx_1 - nz_1)d_1 < 170 \text{ nm} \quad \text{(formula 6)}.$$

9. The liquid crystal panel of claim 1, wherein the second anisotropic optical element comprises a stretched film comprising, as a main component, a polymer having negative birefringence.

10. The liquid crystal panel of claim 1, wherein the initial alignment direction of the liquid crystal cell is parallel to the direction of the absorption axis of the polarizer placed on the light source side of the liquid crystal cell.

11. The liquid crystal panel of claim 1, wherein the initial alignment direction of the liquid crystal cell is perpendicular to the direction of the absorption axis of the polarizer placed on the light source side of the liquid crystal cell.

12. A liquid crystal display comprising the liquid crystal panel of claim 1.

13. A continuous-sheet laminated polarizing plate for use in production of the liquid crystal panel of claim 1, comprising a polarizer, a first anisotropic optical element satisfying $nx_1 > ny_1 > nz_1$, and a second anisotropic optical element satisfying $nz_2 > nx_2 > ny_2$, which are laminated in this order.

\* \* \* \* \*